(12) United States Patent
Kobayashi

(10) Patent No.: US 12,362,675 B2
(45) Date of Patent: Jul. 15, 2025

(54) INTEGRATED CIRCUIT AND POWER SUPPLY CIRCUIT

(71) Applicant: FUJI ELECTRIC CO., LTD., Kawasaki (JP)

(72) Inventor: Yoshinori Kobayashi, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 253 days.

(21) Appl. No.: 18/321,336

(22) Filed: May 22, 2023

(65) Prior Publication Data

US 2024/0022176 A1 Jan. 18, 2024

(30) Foreign Application Priority Data

Jul. 15, 2022 (JP) ................................ 2022-113769

(51) Int. Cl.
| | |
|---|---|
| *H02H 5/04* | (2006.01) |
| *H02H 3/08* | (2006.01) |
| *H02M 1/32* | (2007.01) |
| *H02M 3/335* | (2006.01) |
| *H02M 1/00* | (2006.01) |
| *H02M 1/42* | (2007.01) |

(52) U.S. Cl.
CPC ........ *H02M 3/33569* (2013.01); *H02H 3/085* (2013.01); *H02H 5/04* (2013.01); *H02M 1/0035* (2021.05); *H02M 1/327* (2021.05); *H02M 1/4208* (2013.01)

(58) Field of Classification Search
CPC ......... H02M 1/327; H02H 3/085; H02H 5/04; H02H 5/042; H02H 5/044; H02H 5/047
See application file for complete search history.

(56) References Cited

U.S. PATENT DOCUMENTS

| | | | | |
|---|---|---|---|---|
| 5,543,996 | A | * 8/1996 | Nakago | ................... H02H 5/044 361/103 |
| 6,181,541 | B1 | * 1/2001 | Souri | ................. H03K 17/0822 361/101 |
| 2014/0347895 | A1 | 11/2014 | Tadamasa et al. | |
| 2016/0164425 | A1 | 6/2016 | Chen | |

(Continued)

FOREIGN PATENT DOCUMENTS

| | | |
|---|---|---|
| JP | 2012-110173 A | 6/2012 |
| JP | 2013-038857 A | 2/2013 |
| JP | 2014-230377 A | 12/2014 |

(Continued)

*Primary Examiner* — Gary A Nash
(74) *Attorney, Agent, or Firm* — Rabin & Berdo, P.C.

(57) ABSTRACT

An integrated circuit for a power supply circuit. The integrated circuit includes: a first terminal to which a first resistor, a second resistors, and a switch, of the power supply circuit are coupled; a current output circuit outputting a current to the first terminal; a switch control circuit causing the switch to be in a first state or a second state, in which a voltage according to the first resistor or the second resister are respectively applied to the first terminal; a storage circuit; a processing circuit storing an operating condition of the integrated circuit in the storage circuit, based on a first voltage at the first terminal when the switch is in the first state; and a temperature detection circuit detecting a temperature, based on a second voltage at the first terminal when the switch is in the second state.

12 Claims, 14 Drawing Sheets

(56) References Cited

U.S. PATENT DOCUMENTS

2016/0380530 A1  12/2016  Maruyama
2017/0201181 A1   7/2017  Yabuzaki

FOREIGN PATENT DOCUMENTS

| JP | 2016-111758 A | 6/2016 |
| JP | 2017-017767 A | 1/2017 |
| JP | 2017-060329 A | 3/2017 |
| JP | 2017-127109 A | 7/2017 |

* cited by examiner

| AC INPUT | OPERATION MODE | PULSE NUMBER | PULSE PERIOD |
|---|---|---|---|
| 100V | NORMAL MODE | TWICE | Tx1 |
| | BURST MODE | TWICE | Tx2 |
| 200V | NORMAL MODE | ONCE | Tx1 |
| | BURST MODE | ONCE | Tx2 |

FIG. 10

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application number 2022-113769 filed on Jul. 15, 2022, the entire disclosure of which is hereby incorporated by reference herein.

BACKGROUND

Technical Field

The present disclosure relates to an integrated circuit and a power supply circuit.

Description of the Related Art

Japanese Patent Application Publication No. 2012-110173 discloses a power supply circuit that generates an output voltage at a target level from an input voltage thereof.

Power supply circuits generally include an integrated circuit that controls switching of a power transistor. In such an integrated circuit, provision of a dedicated terminal for determining an operating condition of the integrated circuit increases the number of terminals of the integrated circuit.

SUMMARY

A first aspect of an embodiment of the present disclosure is to provide an integrated circuit for a power supply circuit that includes a first resistor, a second resistor for temperature sensing, and a switch, the integrated circuit comprising: a first terminal to which the first resistor, the second resistor, and the switch are coupled; a current output circuit configured to output a current to the first terminal; a switch control circuit configured to cause the switch to be in a first state in which a voltage according to the first resistor is applied to the first terminal, or a second state in which another voltage according to the second resistor is applied to the first terminal; a storage circuit; a processing circuit configured to store an operating condition of the integrated circuit in the storage circuit, based on a first voltage at the first terminal when the switch is in the first state; and a temperature detection circuit configured to detect a temperature, based on a second voltage at the first terminal when the switch is in the second state.

A second aspect of an embodiment of the present disclosure is to provide a power supply circuit configured to generate an output voltage at a target level from an input voltage thereof, the power supply circuit comprising: an inductor; a transistor configured to control an inductor current flowing through the inductor; a first resistor; a second resistor for temperature sensing; a switch; and an integrated circuit configured to control switching of the transistor, the integrated circuit including: a first terminal to which the first resistor, the second resistor, and the switch are coupled, a current output circuit configured to output a current to the first terminal, a switch control circuit configured to cause the switch to be in a first state in which a voltage according to the first resistor is applied to the first terminal, or a second state in which another voltage according to the second resistor is applied to the first terminal, a storage circuit, a processing circuit configured to store an operating condition of the integrated circuit in the storage circuit, based on a first voltage at the first terminal when the switch is in the first state, a temperature detection circuit configured to detect a temperature, based on a second voltage at the first terminal when the switch is in the second state.

A third aspect of an embodiment of the present disclosure is to provide an integrated circuit comprising: a first terminal to which a first resistor is coupled; a current output circuit configured to output, to the first terminal, a current to pass through the first resistor; a temperature detection circuit configured to detect a temperature, based on a first voltage at the first terminal generated by the current from the current output circuit; and a signal output circuit configured to output, through the first terminal, a setting signal for setting an operation of the external circuit, to an external circuit provided outside the integrated circuit.

A forth aspect of an embodiment of the present disclosure is to provide a power supply circuit configured to generate an output voltage at a target level from an input voltage thereof, the power supply circuit comprising: an inductor; a transistor configured to control an inductor current flowing through the inductor; a first resistor; and an integrated circuit configured to control switching of the transistor, wherein the integrated circuit includes a first terminal to which the first resistor is coupled, a current output circuit configured to output, to the first terminal, a current to pass through the first resistor, a temperature detection circuit configured to detect a temperature, based on a first voltage at the first terminal generated by the current from the current output circuit, and a signal output circuit configured to output, through the first terminal, a setting signal for setting an operation of an external circuit provided outside the integrated circuit, to the external circuit.

BRIEF DESCRIPTION OF THE DRAWINGS

FIG. 10 is a chart for explaining a signal Sstb.

DETAILED DESCRIPTION

Figure 1:
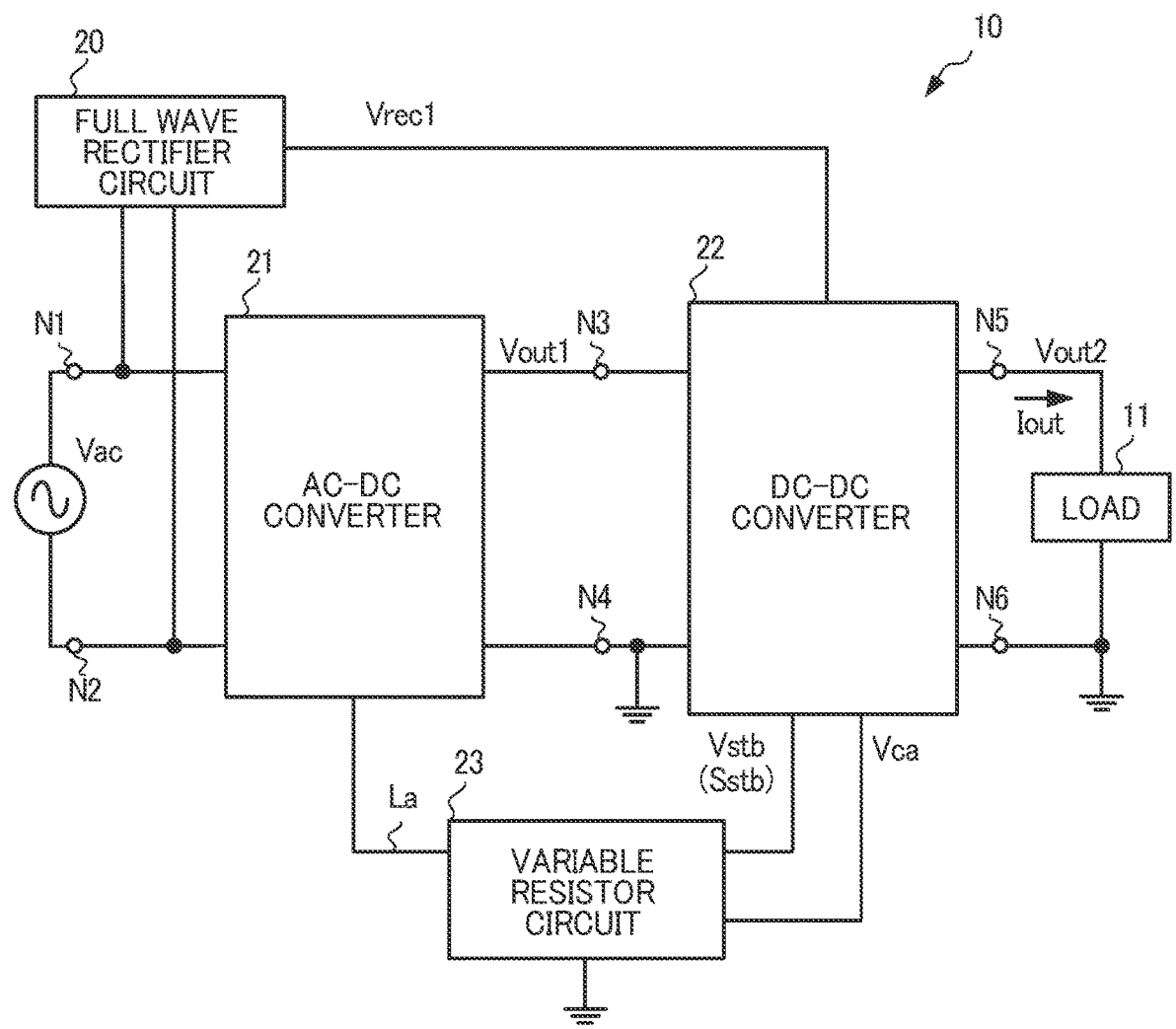
FIG. 1 is a diagram illustrating an example of a power supply device 10.

At least following matters will become apparent from the descriptions of the present specification and the accompanying drawings.

Herein, elements, members, and the like that are the same as or equivalent to those illustrated in the drawings are given the same reference numerals or signs and redundant description thereof is omitted. Further, in embodiments of the present disclosure, when the term "couple" is used, it means to "electrically couple" unless otherwise noted. Accordingly, the term "couple" includes a case in which two components are coupled not only through wiring but also a resistor, for example.

EMBODIMENTS

<<<Overview of Power Supply Device 10>>>

FIG. 1 is a diagram illustrating an example of a power supply device 10. The power supply device 10 drives a load 11 based on a commercial alternating current (AC) voltage Vac, for example. The power supply device 10 includes a full-wave rectifier circuit 20, an AC-DC converter 21, a DC-DC converter 22, and a variable resistor circuit 23.

The full-wave rectifier circuit 20 full-wave rectifies the AC voltage Vac applied to nodes N1, N2, to output a resultant voltage as a voltage Vrec1.

The AC-DC converter 21 outputs an output voltage Vout1 (e.g., 400 V), based on the AC voltage Vac applied to the nodes N1, N2. Note that the AC-DC converter 21 operates in a mode according to a signal Sstb transmitted from the DC-DC converter 22, which will be described later in detail.

The DC-DC converter 22 generates an output voltage Vout2 (e.g., 12 V), based on the output voltage Vout1 generated between nodes N3 and N4.

Figure 2:
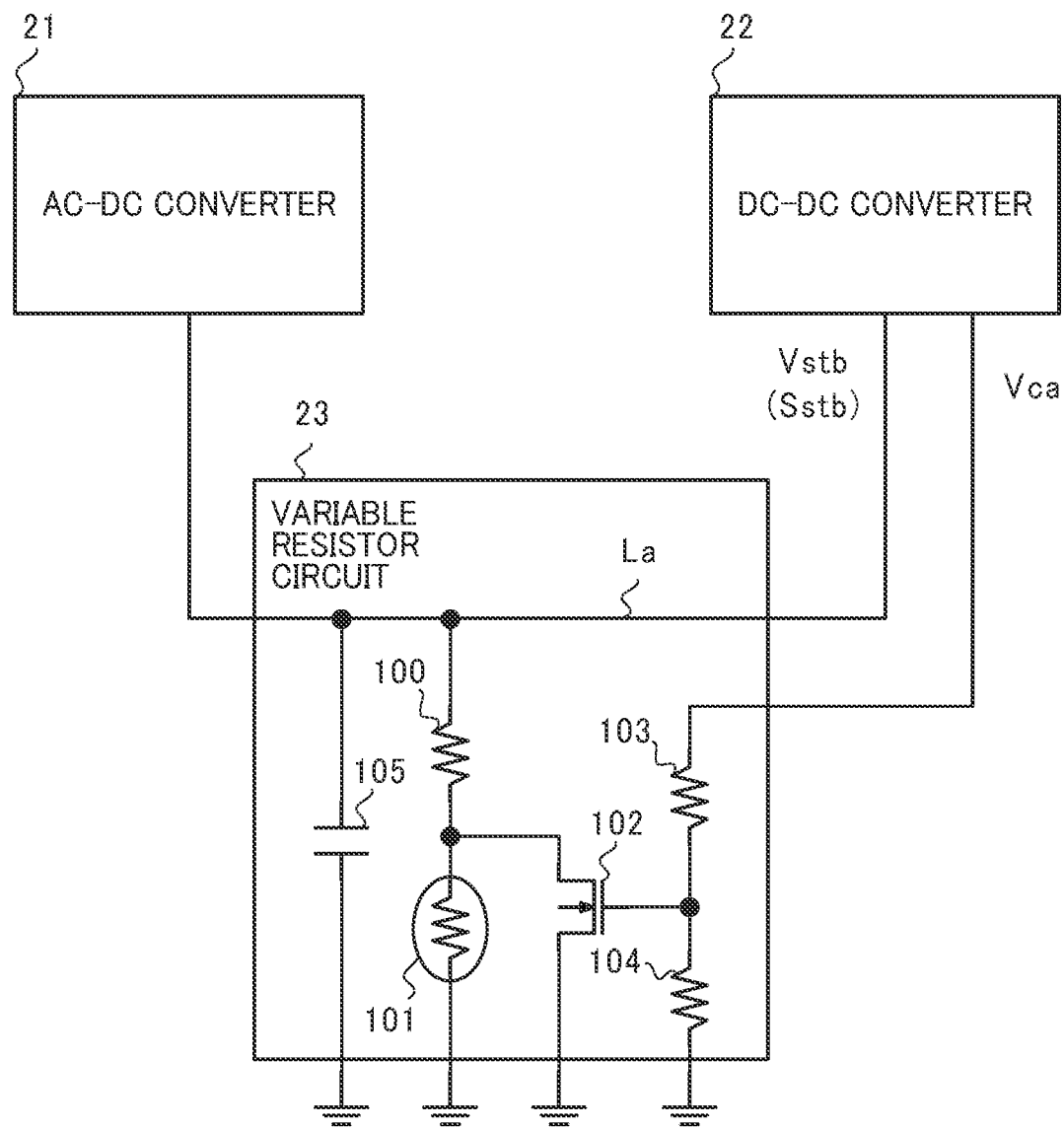
FIG. 2 is a diagram illustrating an example of a variable resistor circuit 23.

The variable resistor circuit 23 is a circuit in which a resistance value varies between the case of temperature sensing and the case of the state setting, which will be described later. FIG. 2 is a diagram illustrating an example of the variable resistor circuit 23. The variable resistor circuit 23 includes resistors 100, 103, 104, a thermistor 101, an N-channel metal-oxide-semiconductor (NMOS) transistor 102, and a capacitor 105.

The resistor 100 is a resistor to set the operating conditions of the DC-DC converter 22. Note that the setting of the operating conditions will be described later in detail.

Further, in an embodiment of the present disclosure, the resistor 100 is coupled to a line La which couples the DC-DC converter 22 and the AC-DC converter 21.

The thermistor 101 is a temperature sensing resistor whose resistance value decreases as a temperature rise, for example. In an embodiment of the present disclosure, the thermistor 101 is coupled in series with the resistor 100.

The NMOS transistor 102 is coupled in series with the resistor 100, and coupled in parallel with the thermistor 101. Thus, in response to turning on of the NMOS transistor 102, the resistance value between the line La and the ground results in the resistance value of the resistor 100. Meanwhile, in response to turning off of the NMOS transistor 102, the resistance value between the line La and the ground results in the resistance value corresponding to the combined resistance of the resistor 100 and the thermistor 101. Here, the on-resistance of the NMOS transistor 102 is ignored as being sufficiently smaller than the resistance value of the resistor 100.

A resistor 103 and a resistor 104 configure a voltage divider circuit to change the state of the NMOS transistor 102, and divide a voltage Vca (described later) outputted from the DC-DC converter 22. The DC-DC converter 22 turns on the NMOS transistor 102 at startup, to output a predetermined current to the line La, which will be described later in detail. Thus, in this case, the voltage at the line La reaches a level corresponding to the resistance value of the resistor 100 for state setting.

Further, the DC-DC converter 22 turns off the NMOS transistor 102 upon completion of the startup, to output the predetermined current to the line La. Thus, in this case, the voltage at the line La reaches a level corresponding to the resistance value of the thermistor 101. Accordingly, in an embodiment of the present disclosure, by changing the state of the NMOS transistor 102, the voltage at the line La can be set to the level according to the resistor 100 for state setting or the level according the thermistor 101 for temperature sensing.

The capacitor 105 is an element to stabilize the direct current level of a voltage Vstb at the line La.

<<<Overview of DC-DC Converter 22>>>

Figure 3:
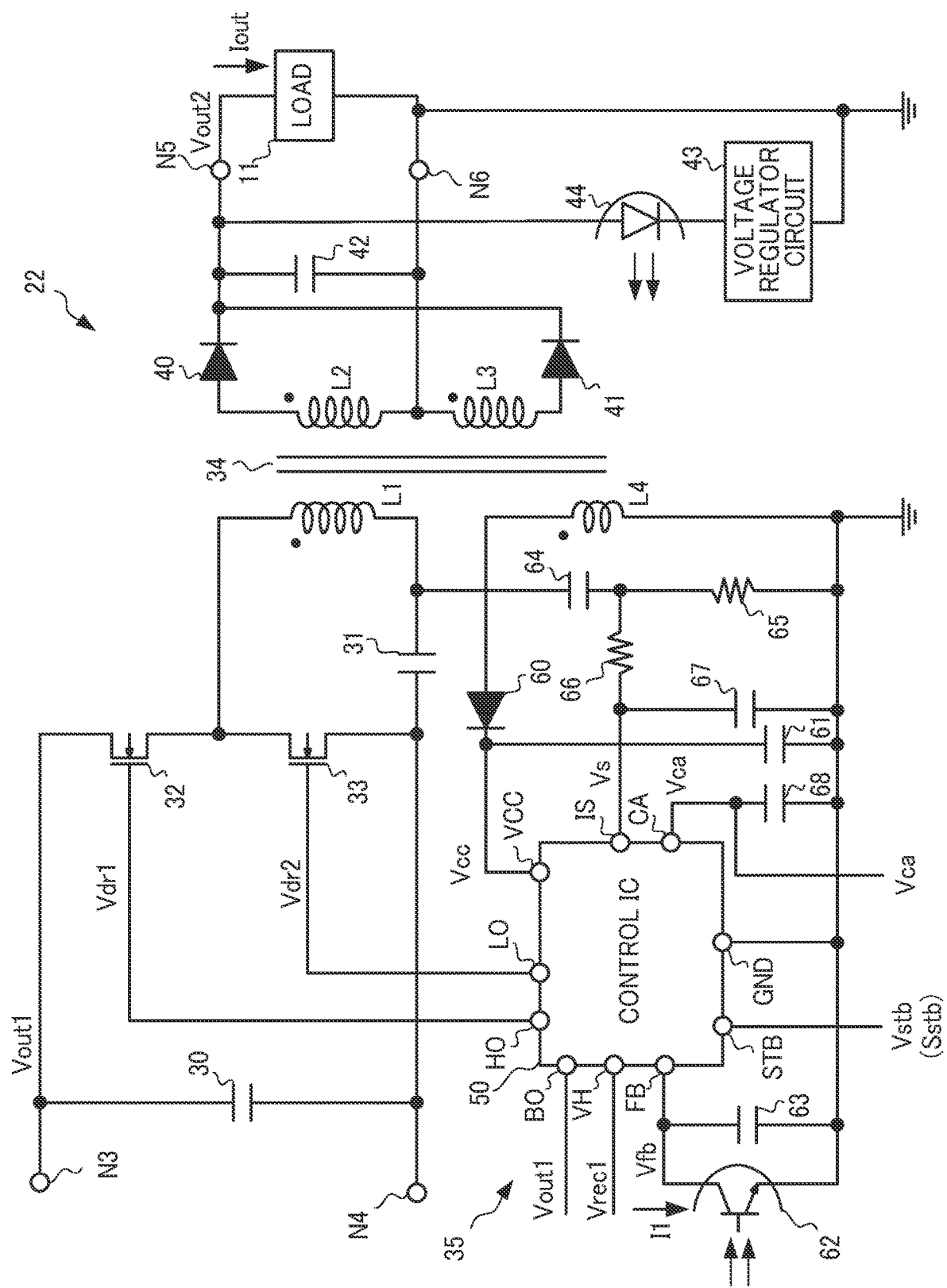
FIG. 3 is a diagram illustrating an example of a DC-DC converter 22.

FIG. 3 is a diagram illustrating an example of the DC-DC converter 22 according to an embodiment of the present disclosure. The DC-DC converter 22 is an LLC current resonant power supply circuit to generate the output voltage Vout2 (e.g., 12 V) at a target level from the predetermined input voltage Vout1 (e.g., 400 V).

The DC-DC converter 22 includes capacitor 30, 31, 42, NMOS transistors 32, 33, a transformer 34, a control block 35, diodes 40, 41, a voltage regulator circuit 43, and a light-emitting diode 44.

The capacitor 30 stabilizes the voltage between a power supply line that receives the input voltage Vout1 and a ground line on the ground side, to thereby remove noise and the like. Note that the input voltage Vout1 is a direct current (DC) voltage at a predetermined level.

The NMOS transistor 32 is a high-side power transistor, and the NMOS transistor 33 is a low-side power transistor. Note that, in an embodiment of the present disclosure, the NMOS transistors 32, 33 are used as switching devices, however, for example, a P-channel metal-oxide-semiconductor (PMOS) transistors or bipolar transistors may be used instead.

The transformer 34 includes a primary coil L1, secondary coils L2, L3, and an auxiliary coil L4, and the primary coil L1 (inductor), the secondary coils L2, L3, and the auxiliary coil L4 are insulated from one another. In the transformer 34, a voltage is generated at the secondary coils L2, L3 on the secondary side according to a change in the voltage across the primary coil L1 on the primary side, and the voltage at the auxiliary coil L4 on the primary side is generated according to a change in the voltage at the secondary coils L2, L3.

Further, the primary coil L1 has one end coupled to the source of the NMOS transistor 32 and the drain of the NMOS transistor 33, and the other end coupled to the source of the NMOS transistor 33 through the capacitor 31.

Accordingly, upon start of switching of the NMOS transistors 32, 33, the respective voltages at the secondary coils L2, L3 and the auxiliary coil L4 change. Note that the primary coil L1 and the secondary coils L2, L3 are electromagnetically coupled with the same polarity, and the secondary coils L2, L3 and the auxiliary coil L4 are also electromagnetically coupled with the same polarity.

The control block 35 is a circuit block to control switching of the NMOS transistors 32, 33, which will be described later in detail.

The diodes 40, 41 rectify the voltage at the secondary coils L2, L3, and the capacitor 42 smooths a rectified voltage. As a result, the smoothed output voltage Vout2 is generated at the capacitor 42. Note that the output voltage Vout2 results in a DC voltage (e.g., 12 V) at the target level.

The voltage regulator circuit 43 generates a constant DC voltage, and is configured with a shunt regulator, for example.

The light-emitting diode 44 is a device to emit light having an intensity corresponding to the difference between the output voltage Vout2 and the output of the voltage regulator circuit 43, and configure a photocoupler, with a phototransistor 62 which will be described later. In an embodiment of the present disclosure, the higher the level of the output voltage Vout2 is, the greater the intensity of the light from the light-emitting diode 44.

===Control Block 35===

The control block 35 includes a control IC 50, a diode 60, capacitors 61, 63, 64, 67, 68, the phototransistor 62, and resistors 65, 66.

The control IC 50 is an integrated circuit to control switching of the NMOS transistors 32, 33, and has terminals VCC, GND, STB, BO, FB, IS, CA, HO, LO, VH.

The terminal VCC is a terminal to receive a voltage Vcc for operating the control IC 50. The cathode of the diode 60 and one end of the capacitor 61 having the other end grounded are coupled to the terminal VCC. The capacitor 61 is charged in response to the control IC 50 starting switching the NMOS transistors 32, 33, which will be described later in detail. Then, the charge voltage of the capacitor 61 results in the voltage Vcc for operating the control IC 50.

The terminal GND is a terminal coupled to, for example, a housing of a device at which the power supply device 10 is provided (i.e., is grounded).

The terminal STB is a terminal at which the voltage Vstb for setting the operating conditions of the control IC 50 is generated upon startup of the control IC 50. Further, in an embodiment of the present disclosure, the thermistor 101 for sensing a temperature is coupled to the terminal STB, and thus the voltage Vstb according to the temperature is generated at the terminal STB. Further, the signal Sstb for setting the operation of the AC-DC converter 21 is outputted from the terminal STB.

The terminal BO is a terminal to receive the voltage Vout1 outputted from the AC-DC converter 21.

The terminal FB is a terminal at which a feedback voltage Vfb corresponding to the output voltage Vout2 is generated, and is the terminal to which the phototransistor 62 and the capacitor 63 are coupled. The phototransistor 62 passes a bias current I1 having a magnitude according to the light intensity of the light-emitting diode 44 of FIG. 3, from the terminal FB to the ground, and the capacitor 63 is provided to remove noise between the terminal FB and the ground. Thus, the phototransistor 62 operates as a transistor to generate a sink current.

The terminal IS is a terminal to receive a voltage corresponding to the resonant current of the DC-DC converter 22. Here, a voltage corresponding to the current value of the resonant current of the primary coil L1 is generated at the node at which the capacitor 64 and the resistor 65 are coupled. The resistor 66 and the capacitor 67 configure a low-pass filter. Thus, the terminal IS receives a voltage Vs, with noise removed, corresponding to the current value of the resonant current of the primary coil L1.

Note that the current value of the resonant current increases according to the input power of the DC-DC converter 22. Further, the input power of the DC-DC converter 22 increases according to the power consumed by the load 11. Thus, the voltage Vs applied to the terminal IS indicates a voltage corresponding to the power consumption of the load 11.

The terminal CA is a terminal to apply the voltage Vca varying with the voltage Vs at the terminal IS to the capacitor 68.

The terminal VH is a terminal to receive the rectified voltage Vrec1. Note that the control IC 50 starts up based on the rectified voltage Vrec1 at the terminal VH, and charges the capacitor 61 coupled to the terminal VCC, to generate the voltage Vcc.

The terminal HO is a terminal to output a driving signal Vdr1 for driving the NMOS transistor 32, and the gate of the NMOS transistor 32 is coupled to the terminal.

The terminal LO is a terminal to output a driving signal Vdr2 for driving the NMOS transistor 33, and the gate of the NMOS transistor 33 is coupled to the terminal.

Note that the phrase "the load 11 is in a heavy load state" refers to, for example, the case in which the current value of a load current Iout flowing through the load 11 is greater than a predetermined value (e.g., 1A). Further, the phrase "the load 11 is in a light load state" refers to, for example, the case in which the current value of the load current Iout flowing through the load 11 is smaller than the predetermined value (e.g., 1A).

Here, the term "startup" refers to, for example, an operation after when the AC voltage Vac is applied to the power supply device 10 until when a driver circuit 113 in the control IC 50 outputs the driving signals Vdr1, Vdr2 (described later).

Note that, in an embodiment of the present disclosure, the "startup" of the control IC 50 at least includes an operation in a "state setting period" during which various circuits in the control IC 50 are initially set after the AC voltage Vac is applied to the power supply device 10.

<<<Details of control IC 50>>>

Figure 4:
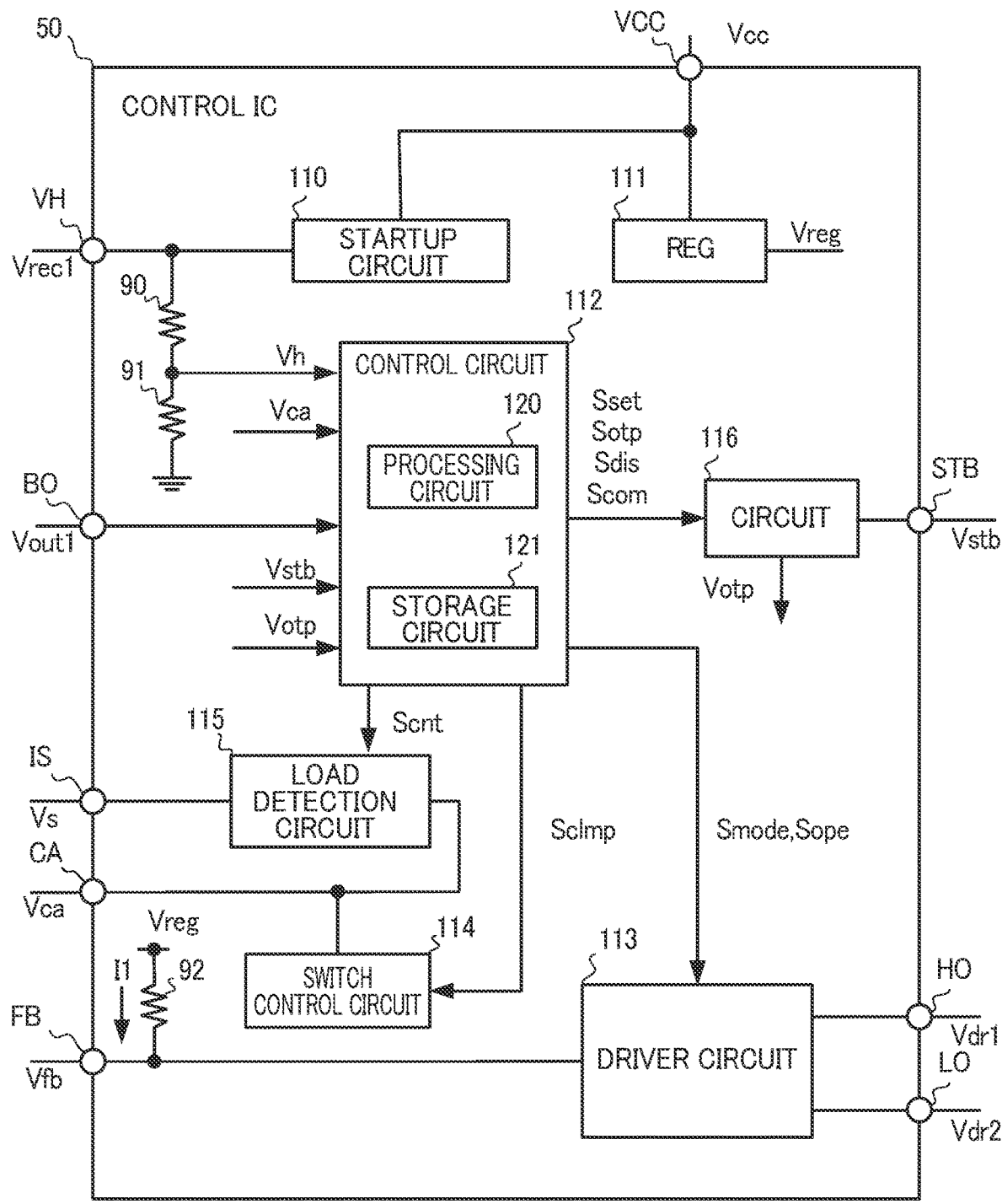
FIG. 4 is a diagram illustrating an example of a control IC 50.

FIG. 4 is a diagram illustrating an example of a configuration of the control IC 50. The control IC 50 includes resistors 90 to 92, a startup circuit 110, an internal power supply (REG) 111, a control circuit 112, the driver circuit 113, a switch control circuit 114, a load detection circuit 115, and a circuit 116.

The resistors 90, 91 configure a voltage divider circuit to generate a voltage Vh obtained by dividing the rectified voltage Vrec1. The resistor 92 is an element to generate, at the terminal FB, the feedback voltage Vfb corresponding to the bias current I1 having a magnitude corresponding to the light intensity of the light-emitting diode 44 in FIG. 2. The resistor 92 has one end to receive a power supply voltage (described later), and the other end coupled to the terminal FB.

Note that, in an embodiment of the present disclosure, in response to the output voltage Vout2 exceeding the target level, the bias current I1 increases, and thus the feedback voltage Vfb drops. Meanwhile, in response to the output voltage Vout2 dropping below the target level, the bias current I1 decreases, and thus the feedback voltage Vfb rises.

Further, in an embodiment of the present disclosure, in addition to resistors 90 to 92, a plurality of resistors (not illustrated), which divide the output voltage Vout1, for example, and output a resultant voltage to the control circuit 112, are provided, however, they are omitted for convenience.

===Startup Circuit 110===

The startup circuit 110 generates a power supply voltage Vcc to operate the control IC 50 when the control IC 50 starts up (or when a power supply voltage Vcc is lower than a predetermined level), based on the rectified voltage Vrec1. Specifically, the startup circuit 110 charges the capacitor 61 coupled to the terminal VCC to generate the voltage Vcc, based on the rectified voltage Vrec1.

Further, the control IC 50 stops charging the capacitor 61, in response to the voltage Vcc becoming sufficiently high and startup of the control IC 50 being completed. Note that, after completion of the startup of the control IC 50, the capacitor 61 coupled to the terminal VCC is charged with the current from the auxiliary coil L4.

===Internal Power Supply 111===

The internal power supply 111 generates a power supply voltage Vreg (e.g., 5V) to operate various circuits (e.g., the control circuit 112) in the control IC 50, based on the power supply voltage Vcc.

===Control Circuit 112===

The control circuit 112 integrally controls the control IC 50. For example, the control circuit 112 stores the operating conditions of the control IC 50, based on the voltage Vstb, and controls the operations of the various circuits in the control IC 50, based on voltages Vh, Vca, Vstb, Votp. Specifically, the control circuit 112 outputs signals Scnt, Sclmp, Sset, Sotp, Sdis, Scom, Smode, Sope for controlling the various circuits, based on a plurality of received voltages.

The control circuit 112 is a digital controller that includes: an analog-to-digital (AD) converter (not illustrated) to convert the voltages Vh, Vca, Vout1, Vstb into digital values, respectively; the processing circuit 120; and a storage circuit 121. Note that the voltage obtained by dividing the voltage Vout1 is inputted to the control circuit 112, as described above, however, a description will be given assuming here that the voltage Vout1 is inputted, for convenience.

The processing circuit 120 stores information indicating the operating conditions of the control IC 50 in the storage circuit 121, based on the voltages inputted to the control circuit 112, and outputs the foregoing various signals (the signal Scnt, etc.). The details of the operation of the processing circuit 120 will be described later. Note that the storage circuit 121 includes a register and/or a memory, for example.

The storage circuit 121 stores various information such as a program for operating the processing circuit 120, information indicating the operating conditions of the control IC 50, and the like. Here, the term "operating conditions" refers to, for example, a condition C1 for the control IC 50 to determine whether an operating mode is set to a normal mode (described later) or a burst mode (described later), and a condition C2 for the control IC 50 to detect that the load 11 is in an overload state. Further, the phrase that the load 11 is in the "overload state" refers to a state in which the load current Iout of the load 11 is larger than a predetermined current (e.g., 2A).

===Driver Circuit 113===

The driver circuit 113 controls switching of the NMOS transistors 32, 33, based on the signals Smode, Sope and the feedback voltage Vfb. In an embodiment of the present disclosure, the driver circuit 113 drives the NMOS transistors 32, 33, based on the signal Sope for operating the driver circuit 113. Meanwhile, the driver circuit 113 stops driving the NMOS transistors 32, 33, based on the signal Sope for stopping the operation of the driver circuit 113.

Further, the driver circuit 113 is operated in the normal mode, in response to the signal Smode at a low level (hereinafter, referred to as low or low level), and is operated in the burst mode, in response to the signal Smode at a high level (hereinafter, referred to as high or high level).

Figure 5:
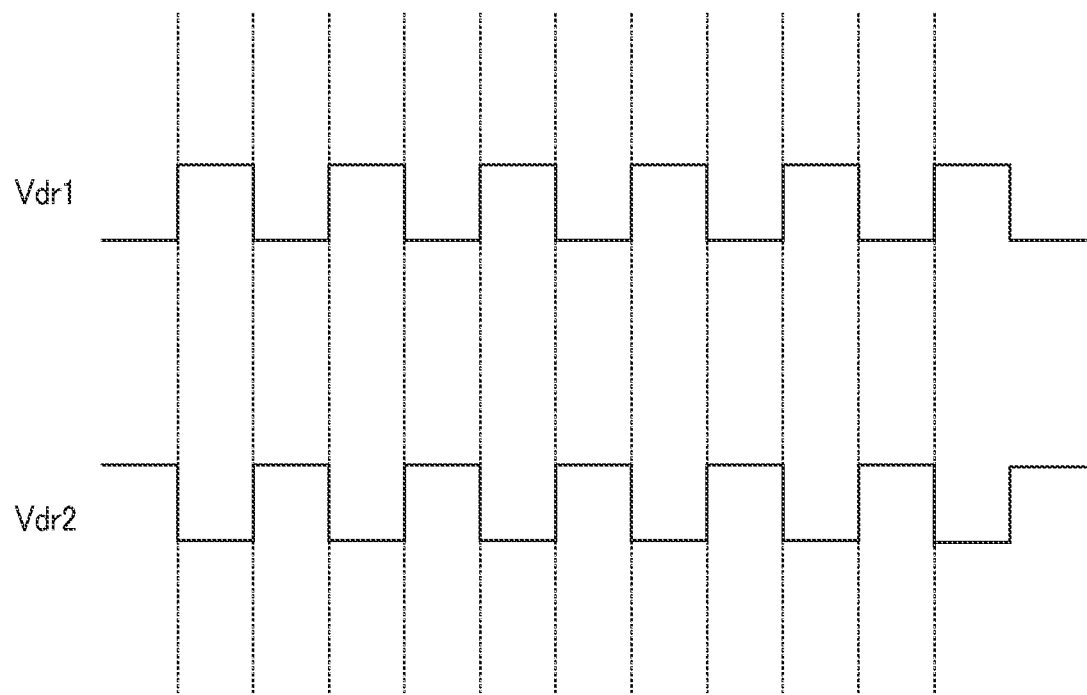
FIG. 5 is a chart illustrating an example of driving signals Vdr1, Vdr2 in a normal mode.

Here, the term "normal mode" refers to an operating mode in which the driver circuit 113 continuously switches the NMOS transistors 32, 33, as illustrated in FIG. 5. In this event, the driver circuit 113 respectively outputs, to the NMOS transistors 32, 33, the pulsed driving signals Vdr1, Vdr2 having a frequency determined by the level of the feedback voltage Vfb and a constant duty cycle (e.g., 50%).

Figure 6:
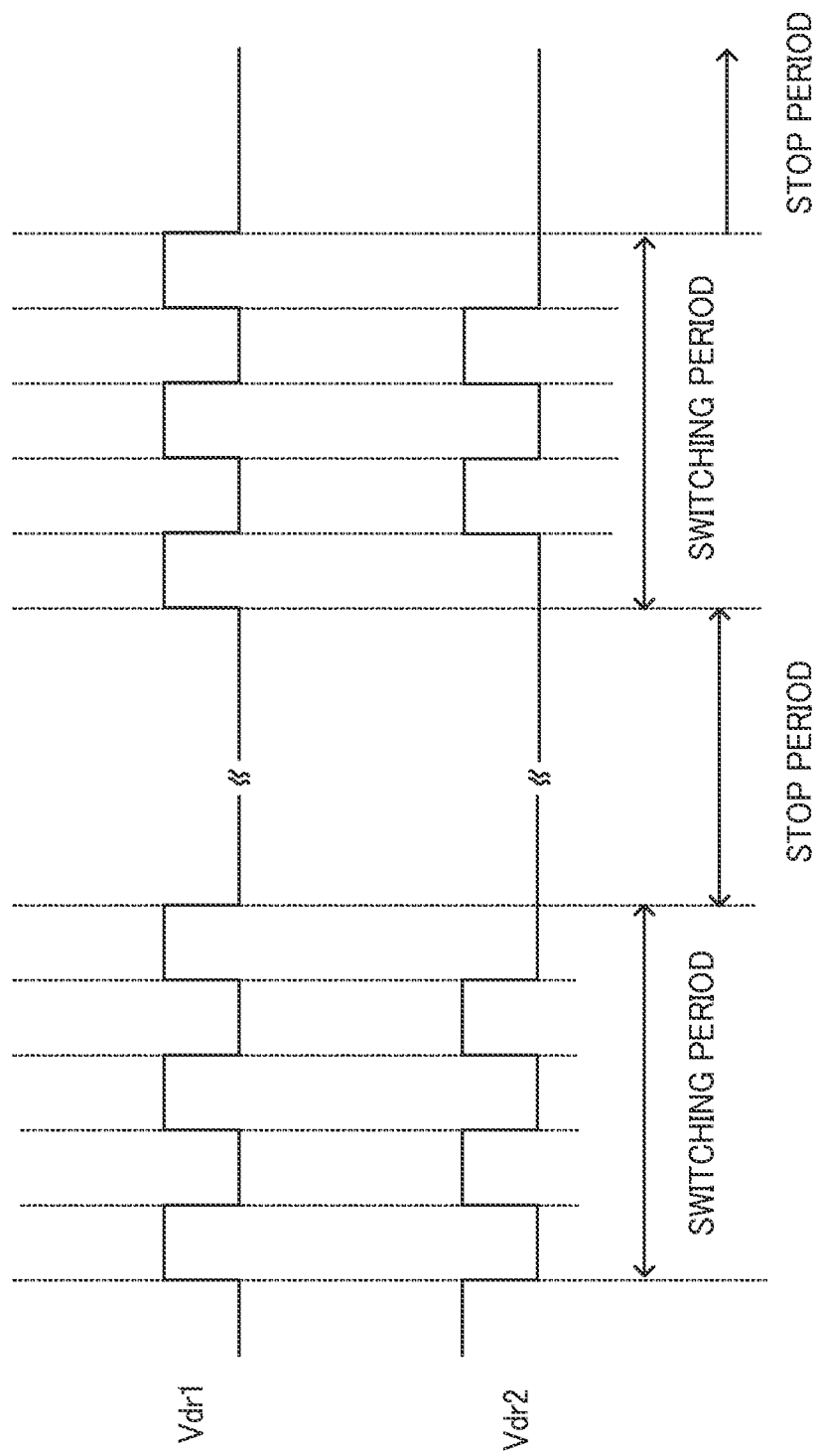
FIG. 6 is a chart illustrating an example of driving signals Vdr1, Vdr2 in a burst mode.

Further, the term "burst mode" refers to an operating mode in which the driver circuit 113 alternately repeats a switching period during which the NMOS transistors 32, 33 are continuously switched, and a stop period during which the switching is intermittently stopped, as illustrated in FIG. 6. Note that the frequency of the driving signals Vdr1, Vdr2 in this event is also determined by the level of the feedback voltage Vfb.

Note that the driver circuit 113 complementarily changes the driving signal Vdr1 and the driving signal Vdr2, while providing a dead time to prevent the NMOS transistors 32, 33 from being on at the same time, both in the normal mode and the burst mode.

Further, as described above, the driver circuit 113 drives the NMOS transistors 32, 33 in response to the signal Smode and the feedback voltage Vfb, when receiving the signal Sope for operating the driver circuit 113.

Meanwhile, the driver circuit 113 stops driving the NMOS transistors 32, 33, when receiving the signal Sope for stopping the operation of the driver circuit 113.

Note that, in an embodiment of the present disclosure, the terminal STB corresponds to a "first terminal", and the terminal CA corresponds to a "second terminal". Further, for example, the resistor 100 in FIG. 2 corresponds to a "first resistor", and the thermistor 101 corresponds to a "second resistor".

In addition, the NMOS transistor 102 corresponds to a "switch", and the gate electrode of the NMOS transistor 102 corresponds to a "control electrode". Further, a state in which the NMOS transistor 102 is on corresponds to a "first state", and a state in which the NMOS transistor 102 is off corresponds to a "second state". Furthermore, the voltage Vstb at the terminal STB in the state in which the NMOS transistor 102 is on corresponds to a "first voltage", and the voltage Vstb at the terminal STB in the state in which the NMOS transistor 102 is off corresponds to a "second voltage".

===Switch Control Circuit 114 and Load Detection Circuit 115===

Figure 7:
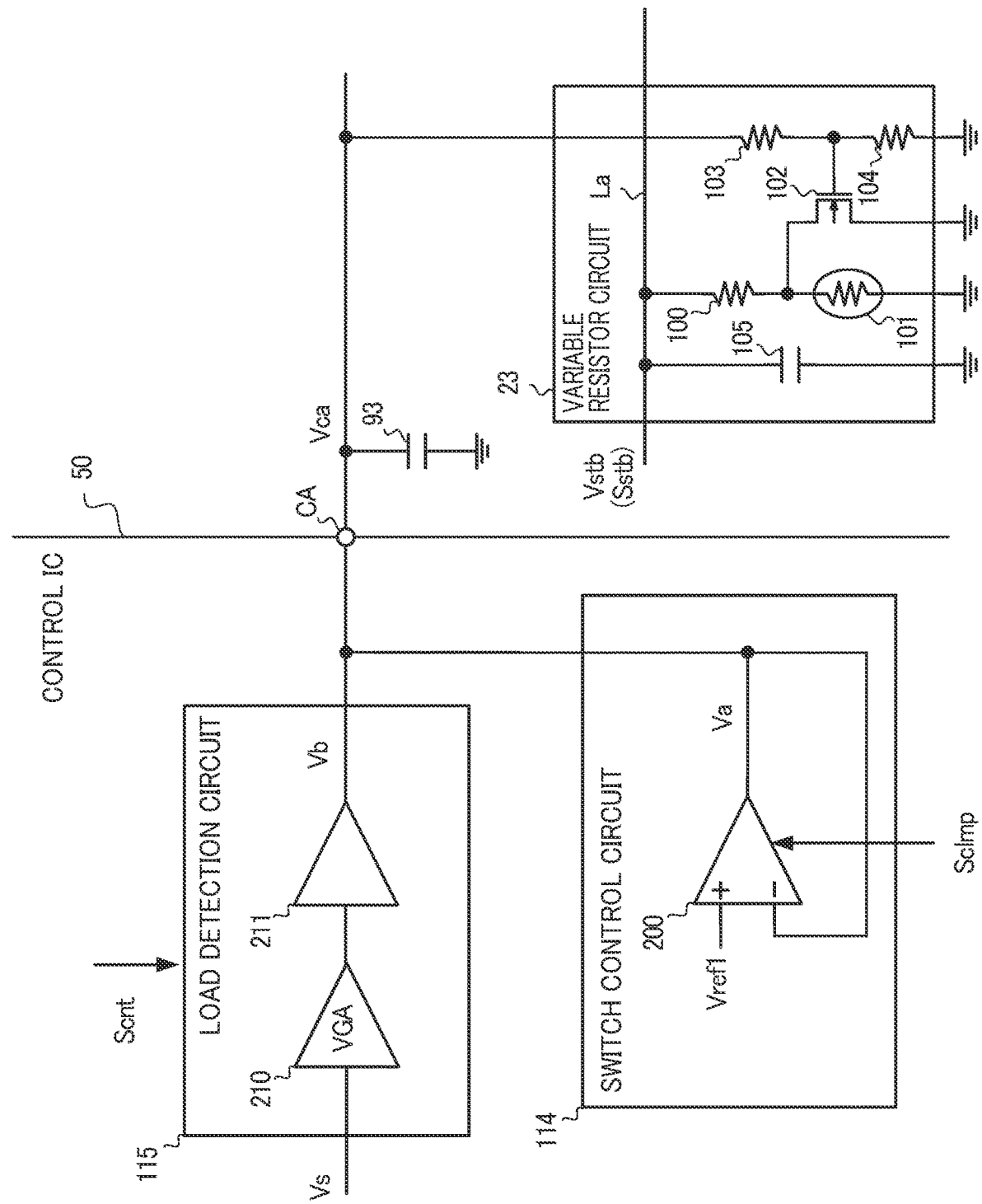
FIG. 7 is a diagram for explaining a switch control circuit 114 and a load detection circuit 115.

FIG. 7 is a diagram illustrating an example of the switch control circuit 114 and the load detection circuit 115. Note that, in FIG. 7, for convenience, the terminal CA and the circuits in the control IC 50 are illustrated at locations different from the locations in FIG. 4.

The switch control circuit 114 outputs the voltage Va to turn on the NMOS transistor 102 of the variable resistor circuit 23, in response to the signal Sclmp going high. Meanwhile, the switch control circuit 114 stops generating the voltage Va, and causes the impedance between the switch control circuit 114 and the terminal CA to high, in response to the signal Sclmp going low.

The switch control circuit 114 is, for example, implemented using an operational amplifier 200 configured to operate in response to the high signal Sclmp and stop operating in response to the low signal Sclmp. The operational amplifier 200 according to an embodiment of the present disclosure has a non-inverting terminal to receive a reference voltage Vref1, and an inverting terminal and an output coupled to each other.

Thus, the operational amplifier 200 outputs the voltage Va having a level equivalent to the level of the reference voltage Vref1, upon receipt of the high signal Sclmp. Note that the reference voltage Vref1 is a voltage at a level at which the NMOS transistor 102 can be turned on, which will be described later in detail.

The load detection circuit 115 detects the state of the load 11 (here, the power consumption of the load 11). Specifically, the load detection circuit 115 outputs the voltage Vb corresponding to the load current Iout flowing through the load 11, based on the voltage Vs applied to the terminal IS.

The load detection circuit 115 includes a variable gain amplifier 210 and a buffer 211. The variable gain amplifier 210 amplifies the voltage Vs by a gain corresponding to the signal Scnt. The buffer 211 applies the voltage outputted from the variable gain amplifier 210, as a voltage Vb, to the terminal CA.

Note that, as described above, the voltages Va, Vb both correspond to the voltage Vca applied to the terminal CA, however, here, they are given different reference signs so that the output of the switch control circuit 114 and the output of the load detection circuit 115 can be distinguished.

Figure 8:
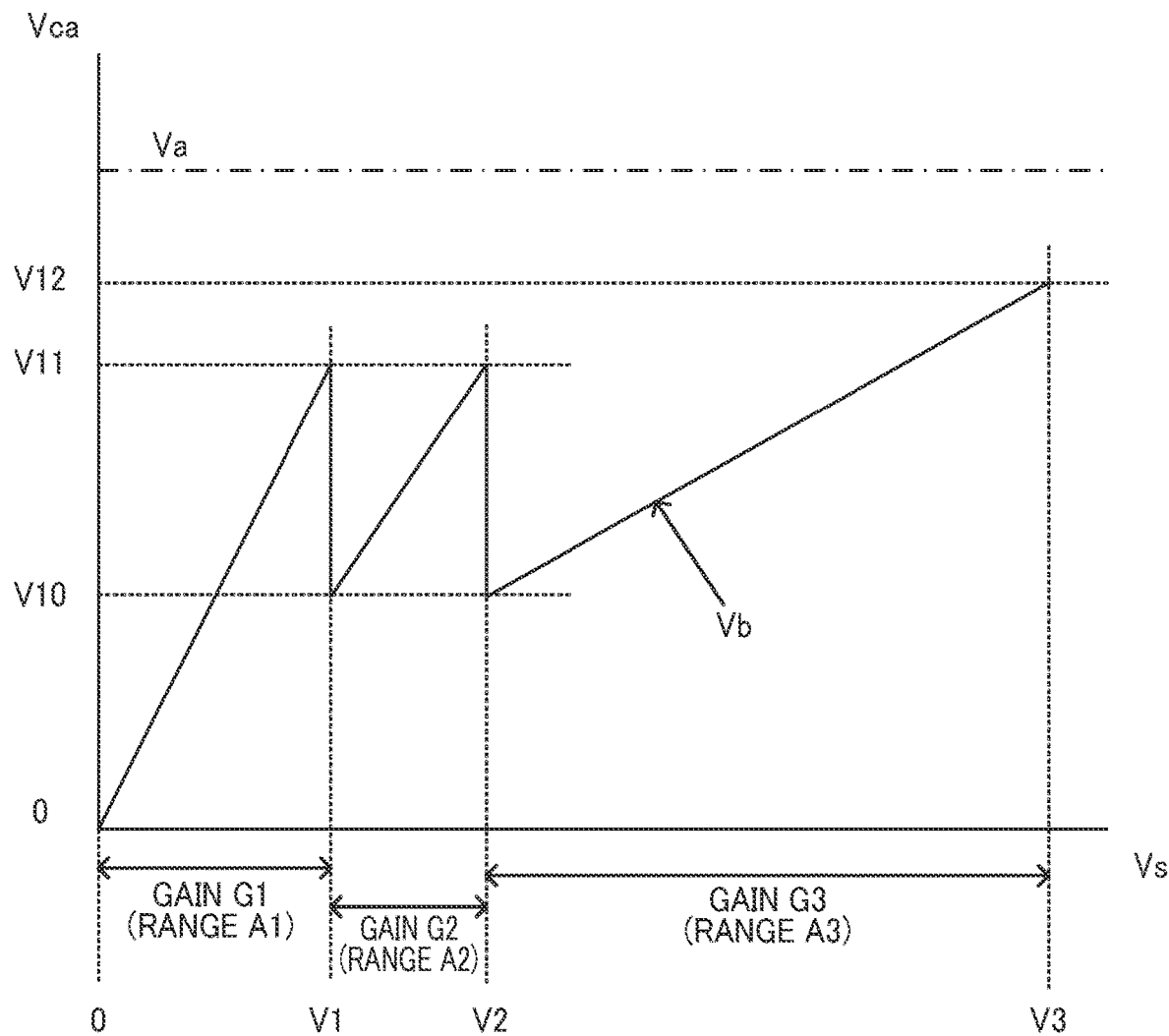
FIG. 8 is a chart for explaining a voltage Vca.

FIG. 8 is a chart for explaining the waveform of the voltage Vca applied to the terminal CA. Here, the voltage Va outputted from the switch control circuit 114 is given by a dashed-dotted line, and the voltage Vb outputted from the load detection circuit 115 is given by a solid line.

Further, in an embodiment of the present disclosure, the signals Sclmp, Scnt are outputted from the control circuit 112 such that the load detection circuit 115 does not operate while the switch control circuit 114 operates, and the load detection circuit 115 operates while the switch control circuit 114 stops operating, which will be described later in detail. Thus, either the voltage Va or the voltage Vb results in being applied to the terminal CA as the voltage Vca.

The switch control circuit 114 according to an embodiment of the present disclosure outputs the voltage Va at a predetermined level as the voltage Vca, and thus, here, the voltage Vb outputted from the load detection circuit 115 according to the load current Iout will be described.

Here, the control circuit 112 changes the gain of the variable gain amplifier 210 of the load detection circuit 115, based on the level of the received voltage Vca. Specifically, as illustrated in FIG. 8, in a range A1 in which the load current Iout of the load 11 is small (range in which the level of the voltage Vs is from 0 to V1 and the level of the voltage Vb is from 0 to V11), the control circuit 112 causes the variable gain amplifier 210 to have a gain G1.

Then, in a range A2 in which the load current Iout gradually increases (range in which the level of the voltage Vs is from V1 to V2 and the level of the voltage Vb is from V10 to V11), the control circuit 112 causes the variable gain amplifier 210 to have a gain G2. Furthermore, in a range A3 in which the load current Iout is large (range in which the level of the voltage Vs is from V2 to V3 and the level of the voltage Va is from V10 to V12), the control circuit 112 causes the variable gain amplifier 210 to have a gain G3.

Note that, in an embodiment of the present disclosure, the gain G1 is larger than the gain G2, and the gain G2 is larger than the gain G3. Further, the load currents Iout in the ranges A1 to A3 are, for example, 0 to 1 mA, 1 mA to 100 mA, and 100 mA to 2 A, respectively.

As such, with the control circuit 112 changing the gain of the variable gain amplifier 210, the voltage Vb changes, as illustrated in FIG. 8, according to the voltage Vs (i.e., the load current Iout).

Further, the load detection circuit 115 according to an embodiment of the present disclosure causes the level of the voltage Vb (i.e., the voltage Vca) to reach V12, in response to the load 11 entering the overload state and the level of the voltage Vs reaching V3. Here, the phrase "the load 11 is in the overload state" refers to the state in which the load current Iout is larger than the predetermined current (e.g., 2 A) indicating an overload.

Further, in response to the level of the voltage Vca reaching V12, the control circuit 112 stops the operation of the driver circuit 113 in FIG. 4 so that the generation of the output voltage Vout2 of the DC-DC converter 22 is stopped, which will be described later in detail. Accordingly, the level of the voltage Vb (voltage Vca) outputted from the load detection circuit 115 does not exceed V12.

Further, in an embodiment of the present disclosure, as illustrated in FIG. 8, the voltage level V12 is lower than the level of the voltage Va (dashed-dotted line) outputted by the switch control circuit 114 described above. Further, for example, the resistance values of the resistors 103, 104 are determined such that the NMOS transistor 102 in FIG. 7 is not turned on even when the level of the voltage Vb is V12. Accordingly, the NMOS transistor 102 is not turned on while the DC-DC converter 22 generates the output voltage Vout2. As a result, while the DC-DC converter 22 operates, the voltage Vstb according to the resistance value of the thermistor 101 is always applied to the terminal STB.

Note that the voltage Vb outputted by the load detection circuit 115 corresponds to a "third voltage", and the voltage Va outputted by the switch control circuit 114 corresponds to a "fourth voltage". Further, the level of the voltage Va outputted by the switch control circuit 114 is out of the range from the level of the voltage Vb (0 V) when the load 11 is in no load state to the level of the voltage Vb (V12) when the load 11 is in the overload state.

===Details of Circuit 116===

Figure 9:
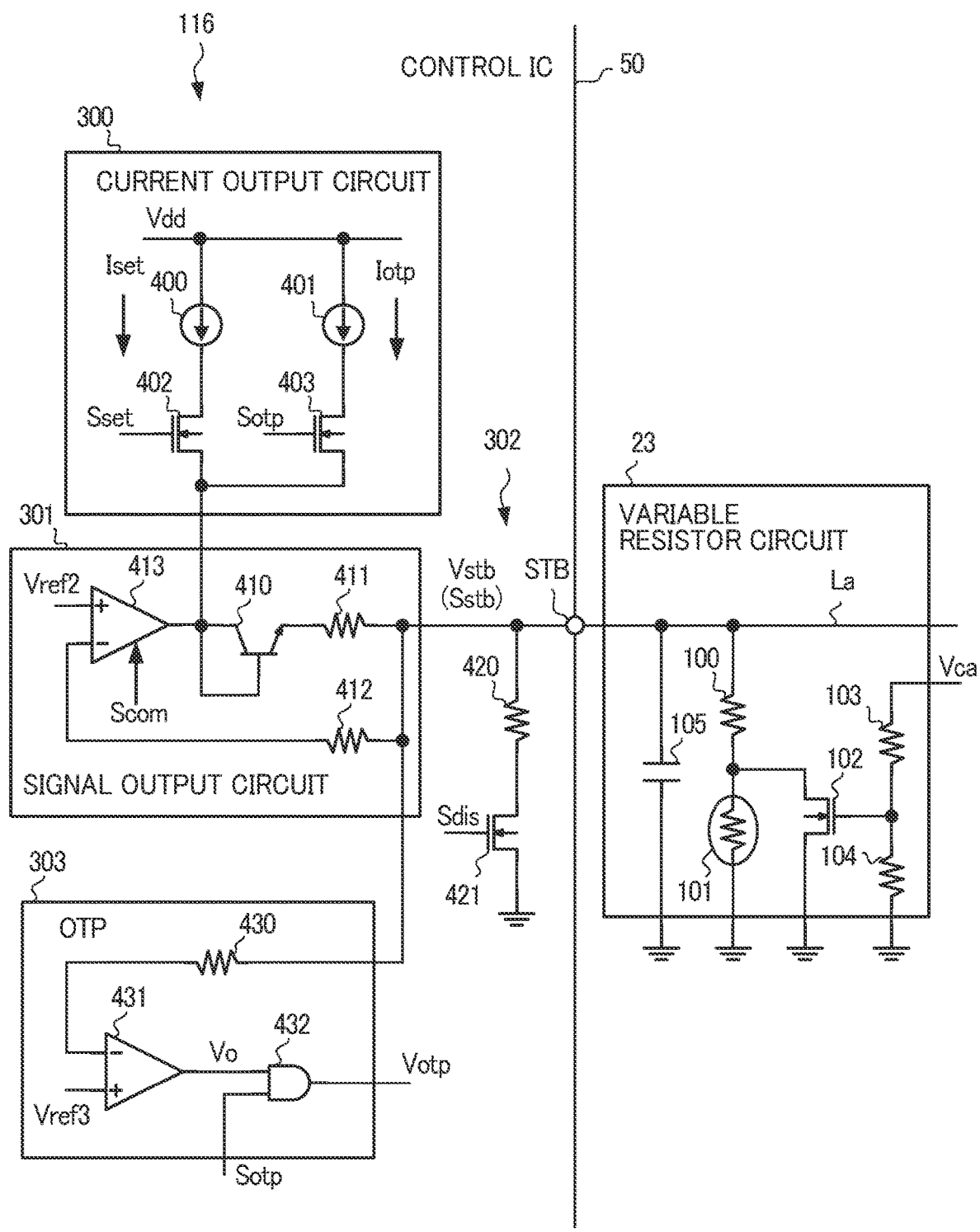
FIG. 9 is a diagram for explaining a circuit 116.

FIG. 9 is a diagram illustrating an example of the circuit 116 in FIG. 4. The circuit 116 includes a current output circuit 300, a signal output circuit 301, a discharge circuit 302, and an overheat protection circuit (OTP) 303.

<<Current Output Circuit 300>>

The current output circuit 300 outputs a current Iset for setting the operating conditions of the control IC 50, and outputs a current Iotp used for the overheat protection circuit 308 to detect a temperature. The current output circuit 300 includes current sources 400, 401, and NMOS transistors 402, 403.

The current source 400 generates the current Iset, and the current source 401 generates the current Iotp. The NMOS transistor 402 is a switch coupled in series with the current source 400, and is on when the signal Sset is high, and is off when the signal Sset is low.

The NMOS transistor 403 is a switch coupled in series with the current source 401, and is on when the signal Sotp is high, and is off when the signal Sotp is low.

Accordingly, the current output circuit 300 outputs the current Iset when the signal Sset is high, and outputs the current Iotp when the signal Sotp is high. Note that, in an embodiment of the present disclosure, the current Iset is larger than the current Iotp. Further, the current Iset corresponds to a "first current", and the current Iotp corresponds to a "second current".

<<Signal Output Circuit 301>>

The signal output circuit 301 outputs the setting signal Sstb for setting the operation of the AC-DC converter 21, in response to the signal Scom from the control circuit 112. Further, the signal output circuit 301 outputs, to the terminal STB, the current Iset, Iotp outputted from the current output circuit 300. The signal output circuit 301 includes an NPN transistor 410, resistors 411, 412, and an operational amplifier 413.

The NPN transistor 410 is a so-called diode-connected transistor, and has its collector and base coupled to the output node of the current output circuit 300, and its emitter coupled to the terminal STB through the resistor 411. Thus, the current from the current output circuit 300 is outputted to the terminal STB through the NPN transistor 410 and the resistor 411.

Incidentally, the NPN transistor 410 is diode-connected, and thus operates as a "reverse current protection element" for preventing the current from flowing from the terminal STB to the operational amplifier 413. Note that, in an embodiment of the present disclosure, the NPN transistor 410 is used as a "reverse current protection element", however, for example, a diode having its anode coupled to the current output circuit 300 and the operational amplifier 413, and its cathode coupled to the terminal STB may be used.

The resistor 412 and the operational amplifier 413 output the setting signal Sstb to the AC-DC converter 21, with the foregoing reverse current protection element (NPN transistor 410).

The operational amplifier 413, for example, operates in response to the high signal Scom, and stop operating in response to the low signal Scom. The operational amplifier 413 according to an embodiment of the present disclosure has a non-inverting terminal to receive a reference voltage Vref2, and an output and an inverting terminal coupled through the NPN transistor 410 and the resistors 411, 412.

Thus, the operational amplifier 413 changes the voltage Vstb at the terminal STB to the level corresponding to the reference voltage Vref2, upon receiving the high signal Scom. Specifically, the operational amplifier 413 changes the level of the voltage Vstb to the level that is lower than the reference voltage Vref2 by the forward voltage of the diode of the NPN transistor 410, during a time period the high signal Scom is received. Note that, in an embodiment of the present disclosure, the voltage Vstb changing in response to the high signal Sclmp may be referred to as "signal Sstb".

Further, the operational amplifier 413 stop generating the signal Sstb, and causing the impedance between the output of the operational amplifier 413 and the NPN transistor 410 to be high, in response to the signal Scom going low.

Incidentally, the signal output circuit 301 according to an embodiment of the present disclosure outputs the signal Sstb including information indicating the effective value of the AC voltage Vac and information indicating the operating mode of the AC-DC converter 21. Here, the effective value of the AC voltage Vac is 100 V or 200 V. Then, the signal output circuit 301 according to an embodiment of the present disclosure outputs the signal Sstb that goes high twice, when the effective value of the AC voltage Vac is 100 V (see FIG. 10). Further, the signal output circuit 301 outputs the signal Sstb that goes high once, when the effective value of the AC voltage Vac is 200 V. FIG. 10 is a chart for explaining the signal Sstb.

Further, the operating mode of the AC-DC converter 21 is the normal mode or the burst mode. Thus, the signal output circuit 301 according to an embodiment of the present disclosure outputs the signal Sstb that is high during a time period Tx1, when the AC-DC converter 21 is operated in the normal mode. Further, the signal output circuit 301 outputs the signal Sstb that is high during a time period Tx2, when the AC-DC converter 21 is operated in the burst mode. Note that the time period Tx1 and the time period Tx2 are different time periods.

Accordingly, for example, when the effective value of the AC voltage Vac is 100 V, and the AC-DC converter 21 is operated in the normal mode, the signal output circuit 301 outputs the signal that is high during the time period Tx1 twice, as the signal Sstb. Note that, hereinafter, when the effective value of the AC voltage Vac is 100 V and the operating mode is the normal mode, this may be denoted as (effective value, operating mode)=(100 V, normal mode). Further, in an embodiment of the present disclosure, the processing circuit 120 causes the signal Scom to be high during a time period Tx twice, to thereby generate the signal Sstb, which will be described later in detail.

<<Discharge Circuit 302>>

The discharge circuit 302 discharges the capacitor 105 of the variable resistor circuit 23, in response to the signal Sdis from the control circuit 112. The discharge circuit 302 includes a resistor 420 and an NMOS transistor 421.

The resistor 420 and the NMOS transistor 421 are coupled in series between the terminal STB and the ground. The NMOS transistor 421 is turned on, in response to the signal Sdis going high, to thereby discharge the capacitor 105. Note that the resistor 420 is an element to limit the discharge current from the capacitor 105. Meanwhile, the NMOS transistor 421 is turned off, in response to the signal Sdis going low, to thereby stop discharging the capacitor 105.

<<Overheat Protection Circuit 303>>

The overheat protection circuit 303 detects a temperature, based on the voltage Vstb at the terminal STB, to thereby protect the DC-DC converter 22. The overheat protection circuit 303 includes a resistor 430, a comparator 431, and an AND circuit 432.

The resistor 430 couples the terminal STB and the inverting input terminal of the comparator 431. Further, a reference voltage Vref3 corresponding to a predetermined temperature Ta (e.g., 125° C.) is applied to the non-inverting input terminal of the comparator 431.

The comparator 431 outputs a low voltage Vo indicating that the temperature of the thermistor 101 is lower than the predetermined temperature Ta, when the voltage Vstb at the terminal STB is higher than the reference voltage Vref3. Meanwhile, the comparator 431 outputs a high voltage Vo indicating that the temperature of the thermistor 101 is higher than the predetermined temperature Ta, when the voltage Vstb at the terminal STB is lower than the reference voltage Vref3.

The AND circuit 432 outputs the comparison result of the comparator 431 as the voltage Votp, upon receiving the high signal Sotp from the control circuit 112, to operate the overheat protection circuit 303. Note that, when the signal Sotp is low, the overheat protection circuit 303 always outputs the low voltage Votp. Note that the overheat protection circuit 303 corresponds to a "temperature detection circuit" to detect a temperature.

<<<Details of AC-DC Converter 21>>>

Figure 11:
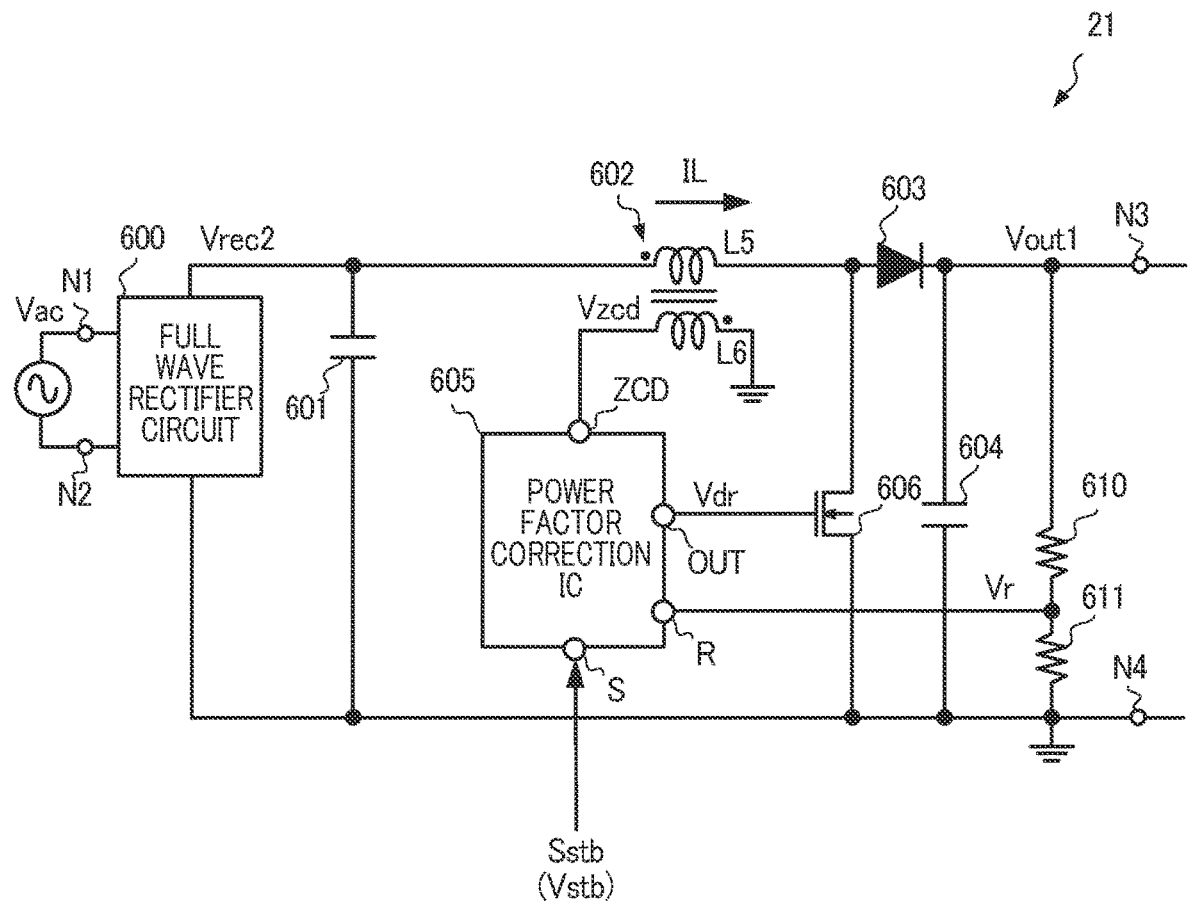
FIG. 11 is a diagram illustrating an example of an AC-DC converter 21.

FIG. 11 is a diagram illustrating an example of the AC-DC converter 21. The AC-DC converter 21 is a boost chopper power supply circuit to generate the output voltage Vout1 of a target level from the AC voltage Vac of a commercial power supply. Further, the AC-DC converter 21 according to an embodiment of the present disclosure operates as a power factor correction circuit.

The AC-DC converter 21 includes a full-wave rectifier circuit 600, capacitors 601, 604, a transformer 602, a diode 603, a power factor correction IC 605, an NMOS transistor 606, and resistors 610, 611.

The full-wave rectifier circuit 600 applies a voltage Vrec2 obtained by full-wave rectifying the predetermined AC voltage Vac applied thereto, to the capacitor 601 and a main coil L5 of the transformer 602. Here, the AC voltage Vac is a voltage in a range from 100 to 240 V with a frequency in a range from 50 to 60 Hz, for example.

The capacitor 601 is an element to smooth the rectified voltage Vrec2, and the transformer 602 has the main coil L5 and an auxiliary coil L6 magnetically coupled to the main coil L5. Here, in an embodiment of the present disclosure, the auxiliary coil L6 is wound such that the voltage generated at the auxiliary coil L6 has a polarity opposite to the polarity of the voltage generated at the main coil L5. Further, a voltage Vzcd generated at the auxiliary coil L6 is applied to a terminal ZCD of the power factor correction IC 605 (described later).

The rectified voltage Vrec2 is directly applied to the main coil L5, however, may be applied to the main coil L5 through an element(s) such as a resistor (not illustrated) and/or the like, for example.

Further, the main coil L5 configures a boost chopper circuit, with the diode 603, the capacitor 604, and the NMOS transistor 606. Accordingly, the charge voltage of the capacitor 604 results in the DC output voltage Vout1. Note that the output voltage Vout1 is 400 V, for example.

The power factor correction IC 605 is an integrated circuit to control switching of the NMOS transistor 606 such that the level of the output voltage Vout1 reaches the target level (e.g., 400 V), while improving the power factor of the AC-DC converter 21. The power factor correction IC 605 has the terminal ZCD and terminals OUT, R, S. Note that, in addition to the foregoing four terminals, the power factor correction IC 605 has a terminal for power supply, terminal for grounding, a terminal for phase compensation, and the like, however, they are omitted here for convenience. Further, the details of the power factor correction IC 605 will be described later.

The NMOS transistor 606 is a power transistor to control power of the AC-DC converter 21. It is assumed, in an embodiment of the present disclosure, that the NMOS transistor 606 is a metal-oxide-semiconductor (MOS) transistor, however, it is not limited thereto. The NMOS transistor 606 may be, for example, a bipolar transistor as long as it is a transistor capable of controlling power. Further, the gate electrode of the NMOS transistor 606 is coupled so as to be driven by the signal from the terminal OUT.

The resistors 610, 611 configure a voltage divider circuit to divide the output voltage Vout1, to generate a feedback voltage Vr used in switching the NMOS transistor 606. Note that the feedback voltage Vr generated at the node at which the resistors 610, 611 are coupled is applied to the terminal R.

<<Example of Power Factor Correction IC 605>>

Figure 12:
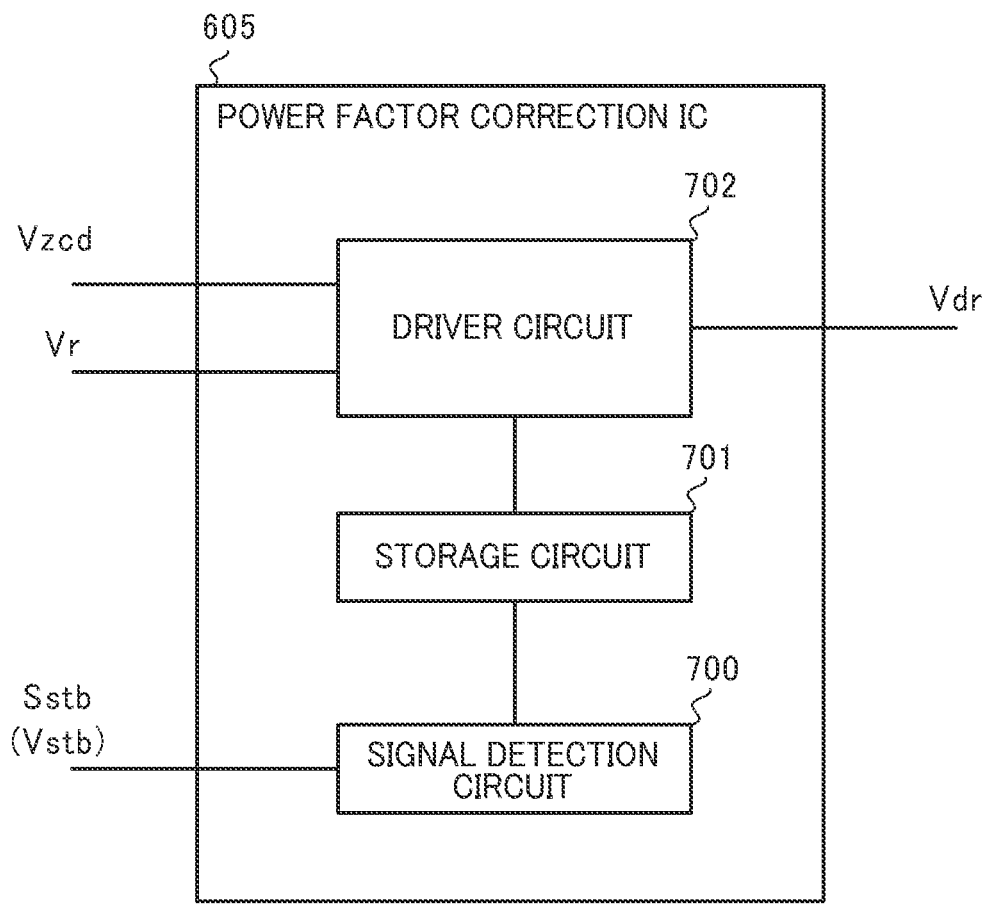
FIG. 12 is a diagram illustrating an example of a power factor correction IC 605.

FIG. 12 is a diagram illustrating an example of the power factor correction IC 605. The power factor correction IC 605 drives the NMOS transistor 606, based on the signal Sstb, the voltage Vzcd corresponding to an inductor current IL, and the voltage Vr corresponding to the output voltage Vout1. The power factor correction IC 605 includes a signal detection circuit 700, a storage circuit 701, and a driver circuit 702.

The signal detection circuit 700 detects the signal Sstb outputted from the DC-DC converter 22, and stores information D1 indicated by the signal Sstb in the storage circuit 701. Note that, as described above, the information D1 includes the effective value of the AC voltage Vac and the operating mode of the AC-DC converter 21. Further, the storage circuit 701 includes a register and/or a memory, for example. Note that the signal Sstb corresponds to "a setting signal for setting the operation" of the AC-DC converter 21.

The driver circuit 702 adjusts the target level of the output voltage Vout1, based on information indicating the effective value in the information D1 of the storage circuit 701. Specifically, when the effective value is 200 V, switching of the NMOS transistor 606 is controlled such that the target level of the output voltage Vout1 is lower than that when the effective value is 100 V. Here, the target level of the output voltage Vout1 when the effective value is 100 V is 400 V, for example, and the target level of the output voltage Vout1 when the effective value is 200 V is 390 V, for example.

Further, the driver circuit 702 controls switching of the NMOS transistor 606, in the operating mode included in the information D1. Specifically, when the operating mode included in the information D1 is the normal mode, the driver circuit 702 outputs a driving signal Vdr having the same waveform as the waveforms illustrated in FIG. 5, and continuously drives the NMOS transistor 606.

Meanwhile, when the operating mode included in the information D1 is the burst mode, the driver circuit 702 outputs the driving signal Vdr having the same waveform as the waveforms illustrated in FIG. 6, and drives the NMOS transistor 606 while alternately repeating the switching period and the stop period.

<<<Operation of DC-DC Converter 22>>>

Figure 13:
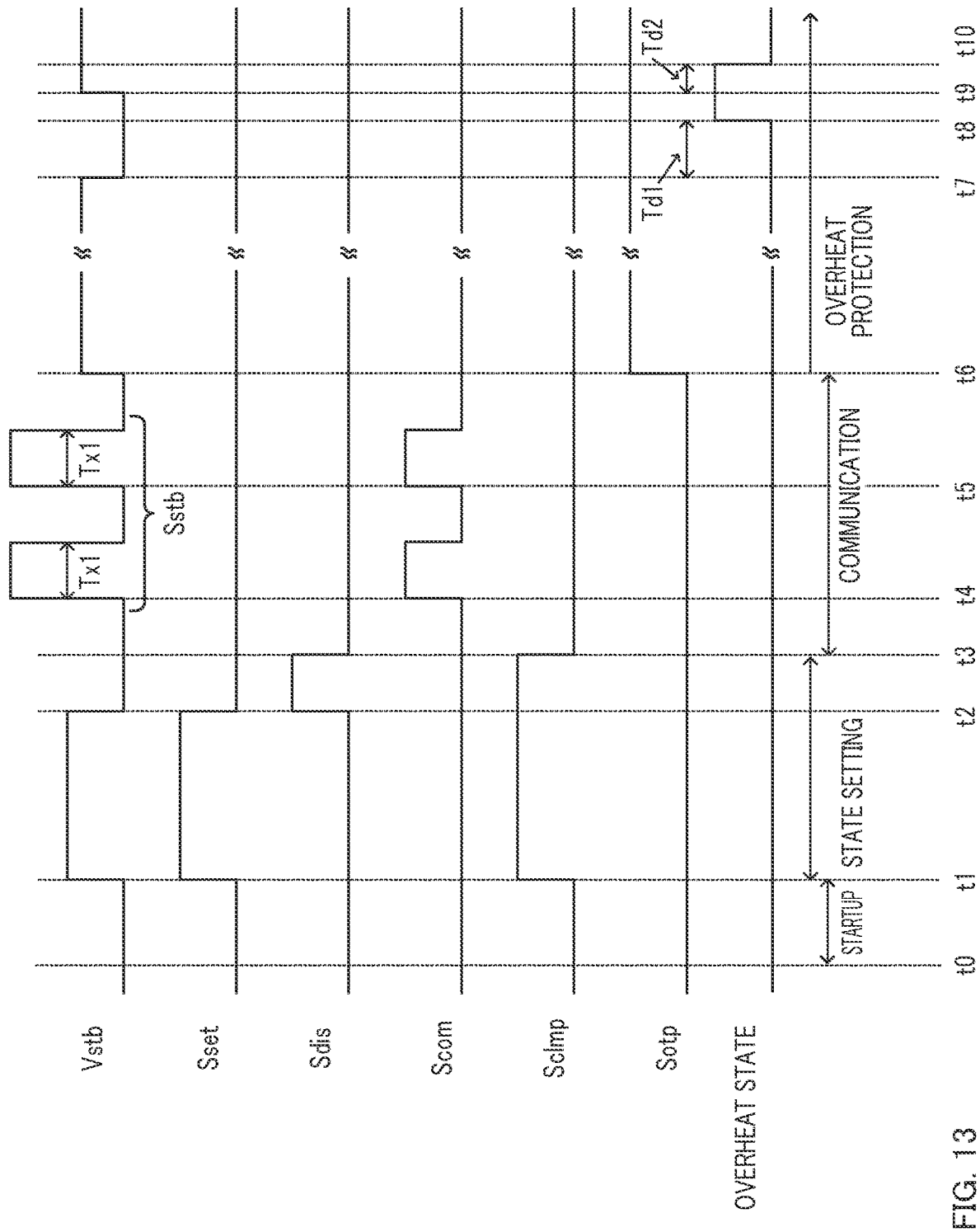
FIG. 13 is a chart for explaining an operation of a DC-DC converter 22.
Figure 14:
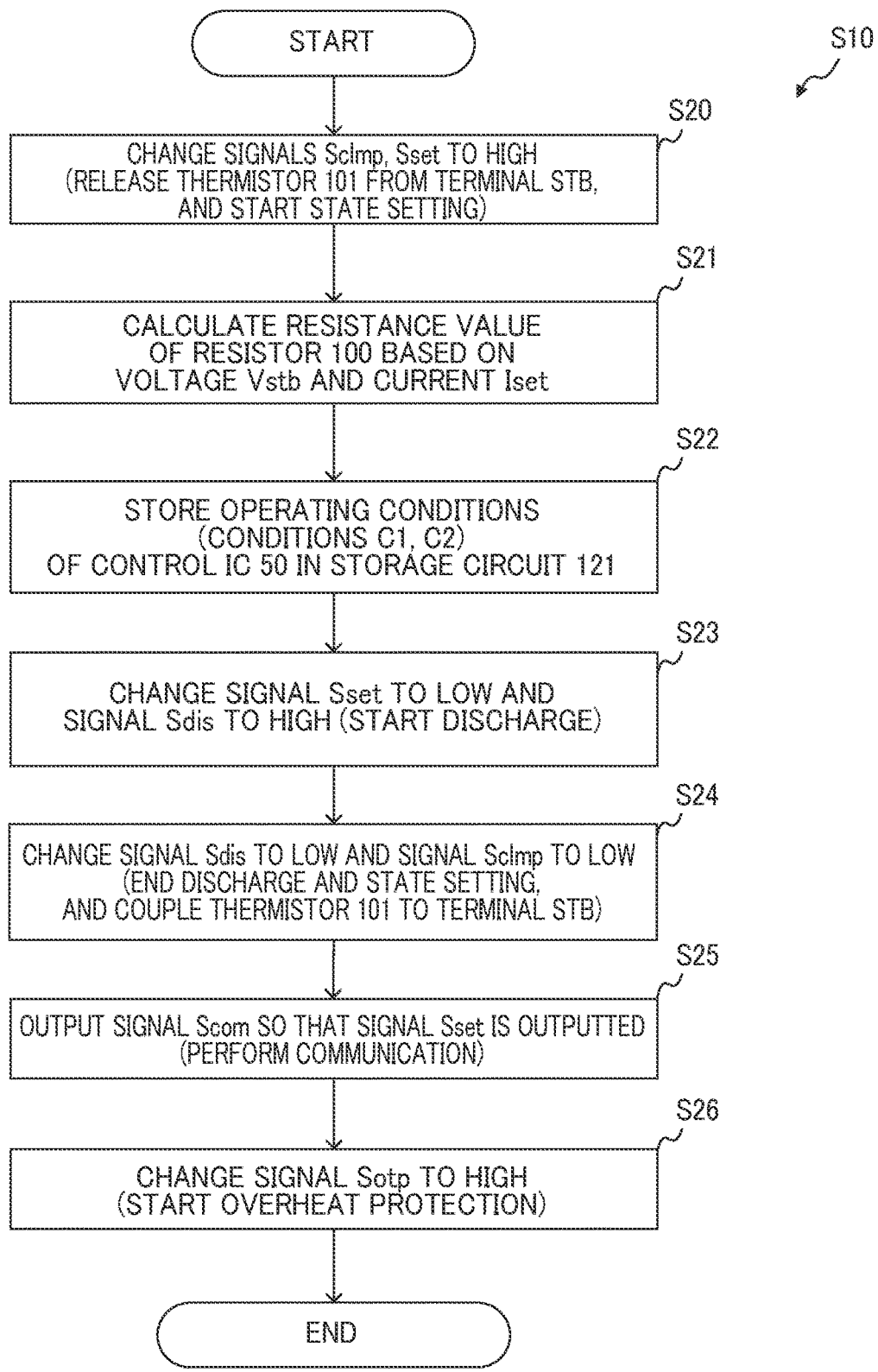
FIG. 14 is a flow chart illustrating an example of a process performed by a processing circuit 120.

FIG. 13 is a chart for explaining the operation of the DC-DC converter 22. Further, FIG. 14 is a flow chart illustrating an example of a process S10 performed by the processing circuit 120. It is assumed here that, from before time t0, the AC voltage Vac is supplied to the power supply device 10 in FIG. 1, and the full-wave rectifier circuit 20 generates the rectified voltage Vrec1. Further, it is assumed here that the effective value of the AC voltage Vac is 100 V.

First, at time t0, in response to the full-wave rectifier circuit 20 outputting the rectified voltage Vrec1 to the DC-DC converter 22, the rectified voltage Vrec1 is applied to the terminal VH of the control IC 50 in FIG. 3. As a result, the startup circuit 110 in FIG. 4 charges the capacitor 61 coupled to the terminal VCC in FIG. 3. In response to the power supply voltage Vcc being generated, the internal power supply 111 of the control IC 50 generates the power supply voltage Vreg, and thus internal circuits (e.g., the control circuit 112) in the control IC 50 enters an operable state.

Note that, in an embodiment of the present disclosure, the "startup" of the control IC 50 refers to the operation from when the rectified voltage Vrec1 is applied to the terminal VH until when the control circuit 112 starts a state setting operation (described later) at time t1.

At time t1, the processing circuit 120 of the control circuit 112 performs the so-called state setting operation to set the operating conditions of the control IC 50. Specifically, the processing circuit 120 changes the signal Sclmp to high and the signal Sset to high (S20 in FIG. 14), to obtain the resistance value of the resistor 100 for state setting, coupled to the terminal STB, illustrated in FIGS. 2 and 9.

In response to the signal Sclmp going high, the switch control circuit 114 in FIG. 7 applies the voltage Va to the terminal CA, and thus the NMOS transistor 102 of the variable resistor circuit 23 is turned on. Further, in response to the signal Sset going high, the current output circuit 300 in FIG. 9 outputs the current Iset to the terminal STB.

Then, the current Iset flows to the ground through the terminal STB and the resistor 100, and thus the voltage Vstb according to the current Iset and the resistance value of the resistor 100 is generated at the terminal STB. It is assumed, in an embodiment of the present disclosure, that, for example, the respective current values of the currents Iset, Iotp are previously stored in the storage circuit 121.

Thereafter, as illustrated in FIG. 14, the processing circuit 120 calculates the resistance value of the resistor 100, based on the voltage Vstb and the current value of the current Iset (S21). In response to the resistance value of the resistor 100 being calculated, the processing circuit 120 stores the operating conditions of the control IC 50 (conditions C1, C2) determined based on the resistance value of the resistor 100, in the storage circuit 121 (S22).

Specifically, the processing circuit 120 determines a threshold voltage Vth1 (i.e., the condition C1) for switching between the normal mode and the burst mode, based on the resistance value of the resistor 100, and stores it in the storage circuit 121. In an embodiment of the present disclosure, the processing circuit 120 determines the threshold voltage Vth1, based on the table information indicating the relationship between the resistance value of the resistor 100 and the threshold voltage Vth1 previously stored in the storage circuit 121, for example. Note that the processing circuit 120 may determine the threshold voltage Vth1 using a predetermined formula to determine the relationship between the resistance value of the resistor 100 and the threshold voltage Vth1, for example.

The processing circuit 120 operates the control IC 50 in the normal mode, when the voltage Vca is larger than the threshold voltage Vth1, and operates the control IC 50 in the burst mode, when the voltage Vca is smaller than the threshold voltage Vth1.

Accordingly, in an embodiment of the present disclosure, a user who uses the DC-DC converter 22 can select the resistor 100, to thereby determine the condition C1 for switching the operating mode of the control IC 50 ex post facto.

It is assumed, in an embodiment of the present disclosure, that the threshold voltage Vth1 (the condition C1) is determined based on the resistance value of the resistor 100. However, the threshold voltage Vth1 may be changed according to the level of the output voltage Vout1. For example, the threshold voltage Vth1 may be used when the output voltage Vout1 is within a predetermined range (e.g., in a range of ±10%) from a predetermined level (400 V), and the threshold voltage Vth1 may be changed when the output voltage Vout1 is out of the predetermined range.

Specifically, for example, when the output voltage Vout1 exceeds the maximum value in the predetermined range, a smaller value (e.g., the threshold voltage Vth1×0.9) may be used as the threshold voltage. Further, for example, when the output voltage Vout1 drops below the minimum value in the predetermined range, a larger value (e.g., the threshold voltage Vth1×1.1) may be used as the threshold voltage. As such, even if the threshold voltage Vth1 is changed, it is possible to determine whether the mode is the burst mode or the normal mode, based on the resistance value of the resistor 100.

Furthermore, the processing circuit 120 determines a threshold voltage Vth2 (i.e., the condition C2) for determining that the load 11 in the overload state, based on the resistance value of the resistor 100, and stores it in the storage circuit 121. In an embodiment of the present disclosure, the processing circuit 120 determines the threshold voltage Vth2, based on the table information indicating the relationship between the resistance value of the resistor 100 and the threshold voltage Vth2 previously stored in the storage circuit 121, for example. Note that the processing circuit 120 may determine the threshold voltage Vth2 using a predetermined formula to determine the relationship between the resistance value of the resistor 100 and the threshold voltage Vth2, for example.

The processing circuit 120 stops operating the driver circuit 113, when the voltage Vca is larger than the threshold voltage Vth2. Accordingly, in an embodiment of the present disclosure, a user who uses the DC-DC converter 22 can select the resistor 100, to thereby determine the condition C2 for stopping the switching operation due to an overload ex post facto.

Further, at time t2 after when the resistance value of the resistor 100 has been stored, the processing circuit 120 changes the signal Sdis to be high during a predetermined time period, while changing the signal Sset to low (S23). In response to the signal Sset going low, the current Iset is stopped. Further, in response to the signal Sdis going high, the NMOS transistor 421 of the discharge circuit 302 in FIG. 9 is turned on, and thus the capacitor 105 is discharged. Accordingly, the voltage Vstb at the terminal STB results in being substantially zero.

Then, at time t3, the processing circuit 120 changes the signals Sdis, Sclmp to low (S24). As a result, discharging of the capacitor 105 is stopped, the resistor 100 and the thermistor 101 are coupled in series to the terminal STB illustrated in FIG. 9.

Further, the processing circuit 120 performs the process of outputting the signal Sstb for setting the operation of the AC-DC converter 21 at time t4. Specifically, the processing circuit 120 obtains the voltage Vh that varies according to the effective value of the AC voltage Vac, to output the signal Scom to the signal output circuit 301 so that the signal Sset indicating (effective value, operating mode)=(100 V, normal mode) is outputted (S25).

Note that the processing circuit 120 causes the signal output circuit 301 to output the signal Sset indicating the normal mode without fail at time t4 after startup. Accordingly, at this timing, the processing circuit 120 outputs the high signal Scom from each of time t4 and t5 until the predetermined time period Tx1 has elapsed.

As a result, the voltage at the terminal STB is a voltage corresponding to the reference voltage Vref2 from each of time t4 and t5 until the predetermined time period Tx1 has elapsed. In other words, the signal Sstb is outputted to the AC-DC converter 21, from each of time t4 and t5 until the predetermined time period Tx1 has elapsed.

Then, the signal detection circuit 700 of the power factor correction IC 605 in FIG. 12 detects the signal Sset ((effective value, operating mode)=(100 V, normal mode)), and stores the detection result in the storage circuit 701. Thus, the power factor correction IC 605 can operate in response to the signal Sset. Note that the power factor correction IC 605 corresponds to an "external circuit" outside the control IC 50, and the signal Sset corresponds to a "setting signal".

Further, at time t6, the processing circuit 120 changes the signal Sotp to high so that the overheat protection function is enabled (S26). As a result, the current Iotp used in detecting a temperature is outputted from the current output circuit 300. Accordingly, the current Iotp and the voltage Vstb corresponding to the resistance value of the combined resistance of the resistor 100 and the thermistor 101 are generated at the terminal STB. In other words, from time t6, the overheat protection circuit 303 can detect whether the temperature of the thermistor 101 is higher than the predetermined temperature Ta.

Note that, at time t6, the resistance value of the resistor (i.e., the resistor 100 and the thermistor 101) coupled to the terminal STB is larger than the resistance value of the resistor 100 coupled to the terminal STB during the state setting period (e.g., time period from time t1 to t3). In such a case, if the current value of the current Iotp increases, the voltage Vstb may rise too high. Thus, in an embodiment of the present disclosure, the current value of the current Iotp is set smaller than the current value of a current Istb.

Further, in an embodiment of the present disclosure, for example, at time t6, the processing circuit 120 outputs the signal Smode indicating the normal mode and the signal Sope for operating the driver circuit 113, and thus the driver circuit 113 in FIG. 4 starts driving the NMOS transistors 32, 33. As a result, the DC-DC converter 22 generates the output voltage Vout2 at the target level, and applies a resultant voltage to the load 11. Note that, in FIG. 13, the signals Smode, Sope are omitted, for convenience.

Then, for example, at time t7, in response to a temperature rising and the resistance value of the thermistor 101 decreasing, the level of the voltage Vstb drops. Note that, in FIG. 13, the voltage Vstb is dropped to zero, for convenience, so that a change in the voltage Vstb due to temperature rise can be easily understood.

At time t7, in response to a drop in the voltage Vstb, the voltage Votp of the overheat protection circuit 303 in FIG. 9 goes high. Then, at time t8 at which a predetermined delay time period Td1h has elapsed since the voltage Votp goes high, the processing circuit 120 according to an embodiment of the present disclosure detects an overheat and stops the operation of the driver circuit 113. Note here that the overheat state detected by the processing circuit 120 is given at the bottom of FIG. 13.

Further, for example, in response to the temperature of the thermistor 101 dropping at time t9, the level of the voltage Vstb rises. As a result, the voltage Votp of the overheat protection circuit 303 in FIG. 9 goes low. Then, at time t10 at which a predetermined delay time period Td2 has elapsed since the voltage Votp goes low, the processing circuit 120 according to an embodiment of the present disclosure detects that the overheat state is not brought about, and starts operating the driver circuit 113.

Note that, although not illustrated in FIG. 13, in response to the load current Iout of the load 11 increasing and the voltage Vca exceeding the threshold voltage Vth1, for example, after time t10, the processing circuit 120 changes the operating mode of the driver circuit 113 from the normal mode to the burst mode.

As such, the control IC 50 according to an embodiment of the present disclosure can perform state setting, communication, and overheat detection (or overheat protection), using the single terminal STB. Accordingly, the control IC 50 can suppress an increase in the number of terminals, while realizing many functions.

===Others===

In FIG. 9, the resistor 100 and the thermistor 101 are coupled in series between the terminal STB and the ground, and the NMOS transistor 102 is coupled in parallel to the thermistor 101. In such a case, upon turning on of the NMOS transistor 102, the voltage according to the resistor 100 is generated at the terminal STB, and upon turning off of the NMOS transistor 102, the voltage according to the thermistor 101 is generated at the terminal STB.

However, the coupling relationship among the NMOS transistor 102, the thermistor 101, and the resistor 100 coupled to the terminal STB are not limited to the case of FIG. 9. For example, a configuration may be such that a switch having two ends has one end coupled to the terminal STB and the other end thereof coupled to either one of the resistor 100 and the thermistor 101 that are coupled in parallel. Even with such a configuration, the same effects as in an embodiment of the present disclosure can be achieved.

SUMMARY

Hereinabove, the power supply device 10 according to an embodiment of the present disclosure has been described. The control IC 50 according to an embodiment of the present disclosure uses the terminal STB to perform three processes of state setting, communication, and overheat detection (or overheat protection), however, only two processes of, for example, state setting and overheat detection may be performed. Even in such a case, it is possible to suppress an increase in the number of terminals of the control IC 50.

Further, in an embodiment of the present disclosure, the switch control circuit 114 coupled to the terminal CA outputs the voltage Va, to thereby control on and off of the NMOS transistor 102. Accordingly, as compared with the case where a dedicated terminal is provided for the switch control circuit 114, it is possible to reduce the number of terminals of the control IC 50.

Further, the current output circuit 300 outputs the current Iset and the current Iotp to the terminal STB. Thus, in an embodiment of the present disclosure, in each process of state setting and overheat detection, the voltage Vstb can be set to an appropriate level.

Further, the discharge circuit 302 discharges the capacitor 105 upon completion of the process of state setting, (e.g., time t2 in FIG. 13). Accordingly, in an embodiment of the present disclosure, in the process of state setting, it is possible to perform overheat detection with high accuracy while stabilizing the level of the voltage Vstb.

Further, the processing circuit 120 determines whether the driver circuit 113 is operated in the normal mode or the burst mode, according to the condition C1 corresponding to the resistance value of the resistor 100. As such, in an embodiment of the present disclosure, a user who uses the power supply device 10 can set the operating condition of the DC-DC converter 22.

Further, the processing circuit 120 can detect that the load 11 is in the overload state, according to the condition C2 corresponding to the resistance value of the resistor 100. As such, in an embodiment of the present disclosure, a user who uses the power supply device 10 can set the operating condition of the DC-DC converter 22.

Further, the processing circuit 120 determines whether the driver circuit 113 is operated in the normal mode or the burst mode, according to the condition C1 corresponding to the resistance value of the resistor 100. Accordingly, in an embodiment of the present disclosure, a user who uses the power supply device 10 can set the operating condition of the DC-DC converter 22.

Further, in the overheat protection circuit 303, the comparator 431 can detect whether the temperature of the thermistor 101 is higher than the predetermined temperature Ta.

Further, the signal output circuit 301 outputs the signal Sstb for setting the operation of the AC-DC converter 21 through the terminal STB in a time period from time t4 to t6 in FIG. 13, for example. Thus, in an embodiment of the present disclosure, it is possible to suppress an increase in the number of the terminals while realizing a communication function.

Further, the current output circuit 300 stops outputting a current to the terminal STB, while outputting the signal Sstb. Accordingly, the control IC 50 according to an embodiment of the present disclosure can transmit the signal Sstb to the AC-DC converter 21 with high accuracy.

Further, the DC-DC converter 22 can realize various functions (e.g., state setting and overheat protection), by using the control IC 50.

Further, the control IC 50 according to an embodiment of the present disclosure uses the terminal STB, to perform three processes of state setting, communication, and overheat detection (or overheat protection), however, only two processes of, for example, overheat detection and communication may be performed. Even in such a case, it is possible to suppress an increase in the number of terminals of the control IC 50.

Further, the DC-DC converter 22 can realize various functions (e.g., overheat detection and communication), by using the control IC 50.

The present disclosure is directed to provision of an integrated circuit capable of suppressing an increase in the number of terminals.

According to the present disclosure, it is possible to provide an integrated circuit capable of suppressing an increase in the number of terminals.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. An integrated circuit for a power supply circuit that includes a first resistor, a second resistor for temperature sensing, and a switch, the integrated circuit comprising:
   a first terminal to which the first resistor, the second resistor, and the switch are coupled;
   a current output circuit configured to output a current to the first terminal;
   a switch control circuit configured to cause the switch to be in
      a first state in which a voltage according to the first resistor is applied to the first terminal, or
      a second state in which another voltage according to the second resistor is applied to the first terminal;
   a storage circuit;
   a processing circuit configured to store an operating condition of the integrated circuit in the storage circuit, based on a first voltage at the first terminal when the switch is in the first state; and
   a temperature detection circuit configured to detect a temperature, based on a second voltage at the first terminal when the switch is in the second state.

2. The integrated circuit according to claim 1, wherein the power supply circuit further includes
   an inductor,
   a transistor configured to control an inductor current flowing through the inductor, and
   a control electrode configured to control a state of the switch,
the power supply circuit being configured to generate an output voltage at a target level from an input voltage thereof;
   the integrated circuit is configured to control switching of the transistor, and further comprises
      a second terminal to which the control electrode is coupled, and
      a load detection circuit configured to apply, to the second terminal, a third voltage according to power consumption of the power supply circuit;

the switch control circuit applies, to the second terminal, a fourth voltage for causing the switch to be in the first state, upon startup of the integrated circuit; and
   a level of the fourth voltage is out of a range of the third voltage when a load of the power supply circuit is changed from a no-load state to an overload state.

3. The integrated circuit according to claim 2, further comprising: a driver circuit configured to drive the transistor, based on a feedback voltage corresponding to the output voltage, wherein
   the operating condition includes a condition for determining whether an operating mode of the driver circuit is a burst mode or a normal mode, and
   the processing circuit changes the operating mode of the driver circuit, based on the third voltage and the operating condition.

4. The integrated circuit according to claim 3, wherein
   the operating condition further includes a condition for detecting that the load of the power supply circuit is in the overload state, and
   the processing circuit controls the driver circuit so as to stop driving the transistor, in response to the load entering the overload state, based on the third voltage and the operating condition.

5. The integrated circuit according to claim 1, wherein the current output circuit is further configured to
   output a first current, in response to the switch entering the first state, and
   output a second current different from the first current, after the switch enters the second state.

6. The integrated circuit according to claim 5, wherein
   the power supply circuit further includes a capacitor coupled to the first terminal, and
   the integrated circuit further includes a discharge circuit configured to discharge the capacitor, after the operating condition is stored in the storage circuit and before the second current is outputted.

7. The integrated circuit according to claim 1, wherein the temperature detection circuit includes a comparator circuit configured to detect whether the temperature is higher than a predetermined temperature, based on a reference voltage and the second voltage when the switch is in the second state.

8. The integrated circuit according to claim 1, further comprising: a signal output circuit configured to output a setting signal, for setting an operation of an external circuit, to the external circuit provided outside the integrated circuit, after the switch enters the second state.

9. The integrated circuit according to claim 8, wherein the current output circuit stops outputting the current during a time period during which the setting signal is outputted.

10. A power supply circuit configured to generate an output voltage at a target level from an input voltage thereof, the power supply circuit comprising:
   an inductor;
   a transistor configured to control an inductor current flowing through the inductor;
   a first resistor;
   a second resistor for temperature sensing;
   a switch; and
   an integrated circuit configured to control switching of the transistor, the integrated circuit including:
      a first terminal to which the first resistor, the second resistor, and the switch are coupled,
      a current output circuit configured to output a current to the first terminal, a switch control circuit configured to cause the switch to be in
    a first state in which a voltage according to the first resistor is applied to the first terminal, or
    a second state in which another voltage according to the second resistor is applied to the first terminal,
a storage circuit,
a processing circuit configured to store an operating condition of the integrated circuit in the storage circuit, based on a first voltage at the first terminal when the switch is in the first state,
a temperature detection circuit configured to detect a temperature, based on a second voltage at the first terminal when the switch is in the second state.

11. An integrated circuit comprising:
a first terminal to which a first resistor is coupled;
a current output circuit configured to output, to the first terminal, a current to pass through the first resistor;
a temperature detection circuit configured to detect a temperature, based on a first voltage at the first terminal generated by the current from the current output circuit; and
a signal output circuit configured to output, through the first terminal, a setting signal for setting an operation of the external circuit, to an external circuit provided outside the integrated circuit.

12. A power supply circuit configured to generate an output voltage at a target level from an input voltage thereof, the power supply circuit comprising:
an inductor;
a transistor configured to control an inductor current flowing through the inductor;
a first resistor; and
an integrated circuit configured to control switching of the transistor, wherein
the integrated circuit includes
    a first terminal to which the first resistor is coupled,
    a current output circuit configured to output, to the first terminal, a current to pass through the first resistor,
    a temperature detection circuit configured to detect a temperature, based on a first voltage at the first terminal generated by the current from the current output circuit, and
    a signal output circuit configured to output, through the first terminal, a setting signal for setting an operation of an external circuit provided outside the integrated circuit, to the external circuit.

* * * * *